US008494157B2

(12) United States Patent
Takashima et al.

(10) Patent No.: US 8,494,157 B2
(45) Date of Patent: Jul. 23, 2013

(54) APPARATUS, METHOD, AND COMPUTER PROGRAM FOR PROCESSING INFORMATION AND RECORDING MEDIUM STORING COMPUTER PROGRAM

(75) Inventors: Yoshikazu Takashima, Tokyo (JP); Kenjiro Ueda, Kanagawa (JP)

(73) Assignee: Sony Corporation, Tokyo (JP)

( * ) Notice: Subject to any disclaimer, the term of this patent is extended or adjusted under 35 U.S.C. 154(b) by 1473 days.

(21) Appl. No.: 11/833,572

(22) Filed: Aug. 3, 2007

(65) Prior Publication Data

US 2008/0063200 A1 Mar. 13, 2008

(30) Foreign Application Priority Data

Sep. 9, 2006 (JP) ................................ 2006-244908

(51) Int. Cl.
*H04N 7/167* (2011.01)
(52) U.S. Cl.
USPC ............. 380/201; 380/44; 713/189; 713/193; 709/231
(58) Field of Classification Search
USPC .................................................... 380/44, 201
See application file for complete search history.

(56) References Cited

U.S. PATENT DOCUMENTS

| 6,470,138 | B1* | 10/2002 | Um et al. ...................... 386/234 |
| 6,490,408 | B1* | 12/2002 | Um et al. ...................... 386/234 |
| 6,546,193 | B1* | 4/2003 | Um et al. ...................... 386/259 |
| 6,658,566 | B1* | 12/2003 | Hazard ......................... 713/172 |
| 7,213,155 | B2* | 5/2007 | Sako et al ..................... 713/189 |
| 7,258,269 | B1* | 8/2007 | Block et al. ................... 235/379 |
| 7,350,700 | B1* | 4/2008 | Block et al. ................... 235/379 |
| 7,401,232 | B2* | 7/2008 | Ono et al. ...................... 713/193 |
| 7,746,738 | B2* | 6/2010 | Ueda et al. ................. 369/47.12 |
| 7,874,003 | B2* | 1/2011 | Takashima ...................... 726/26 |
| 2002/0154771 | A1* | 10/2002 | Sako et al. .................... 380/201 |
| 2002/0159592 | A1* | 10/2002 | Matsushima et al. ......... 380/201 |
| 2004/0133523 | A1* | 7/2004 | Inokuchi et al. ................ 705/57 |
| 2004/0171405 | A1* | 9/2004 | Amano et al. ............. 455/556.2 |
| 2005/0021985 | A1* | 1/2005 | Ono et al. ...................... 713/193 |
| 2005/0025312 | A1* | 2/2005 | Rijkaert et al. ................ 380/37 |

(Continued)

FOREIGN PATENT DOCUMENTS

| JP | 2002-246993 | 8/2002 |
| JP | 2003-116100 | 4/2003 |

(Continued)

OTHER PUBLICATIONS

U.S. Appl. No. 12/713,762, filed Feb. 26, 2010, Ueda, et al.

(Continued)

*Primary Examiner* — April Y Blair
(74) *Attorney, Agent, or Firm* — Oblon, Spivak, McClelland, Maier & Neustadt, L.L.P.

(57) ABSTRACT

An information processing apparatus for reproducing content recorded on an information recording medium, includes a recording medium controller for reading data recorded on the information recording medium, and a data processor for acquiring from a unit key file recorded on the information recording medium a unit key corresponding to a content management unit set as a usage control unit of content, and decrypting encrypted content recorded on the information recording medium using the acquired unit key. The data processor determines an application type of the encrypted content recorded on the information recording medium, and acquires the unit key and decrypting the encrypted content in accordance with a process sequence corresponding to the application type.

38 Claims, 26 Drawing Sheets

U.S. PATENT DOCUMENTS

| | | | |
|---|---|---|---|
| 2005/0120232 A1* | 6/2005 | Hori et al. | 713/193 |
| 2005/0131998 A1* | 6/2005 | Takashima | 709/203 |
| 2005/0160284 A1* | 7/2005 | Kitani et al. | 713/193 |
| 2006/0129845 A1* | 6/2006 | Nakashima et al. | 713/191 |
| 2007/0081669 A1 | 4/2007 | Takashima et al. | |
| 2007/0219922 A1* | 9/2007 | Shin et al. | 705/59 |
| 2007/0247985 A1* | 10/2007 | Ueda et al. | 369/47.1 |

FOREIGN PATENT DOCUMENTS

| | | |
|---|---|---|
| JP | 2005-92830 A | 4/2005 |
| JP | 2005-191707 A | 7/2005 |
| JP | 2006-72688 A | 3/2006 |
| JP | 2006-74421 | 3/2006 |
| JP | 2006-319954 | 11/2006 |

OTHER PUBLICATIONS

Japanese Office Action issued on Nov. 24, 2010 in corresponding Japanese Application No. 2006-244908.

Office Action issued Feb. 22, 2011, in Japan Patent Application No. 2006-244908.

* cited by examiner

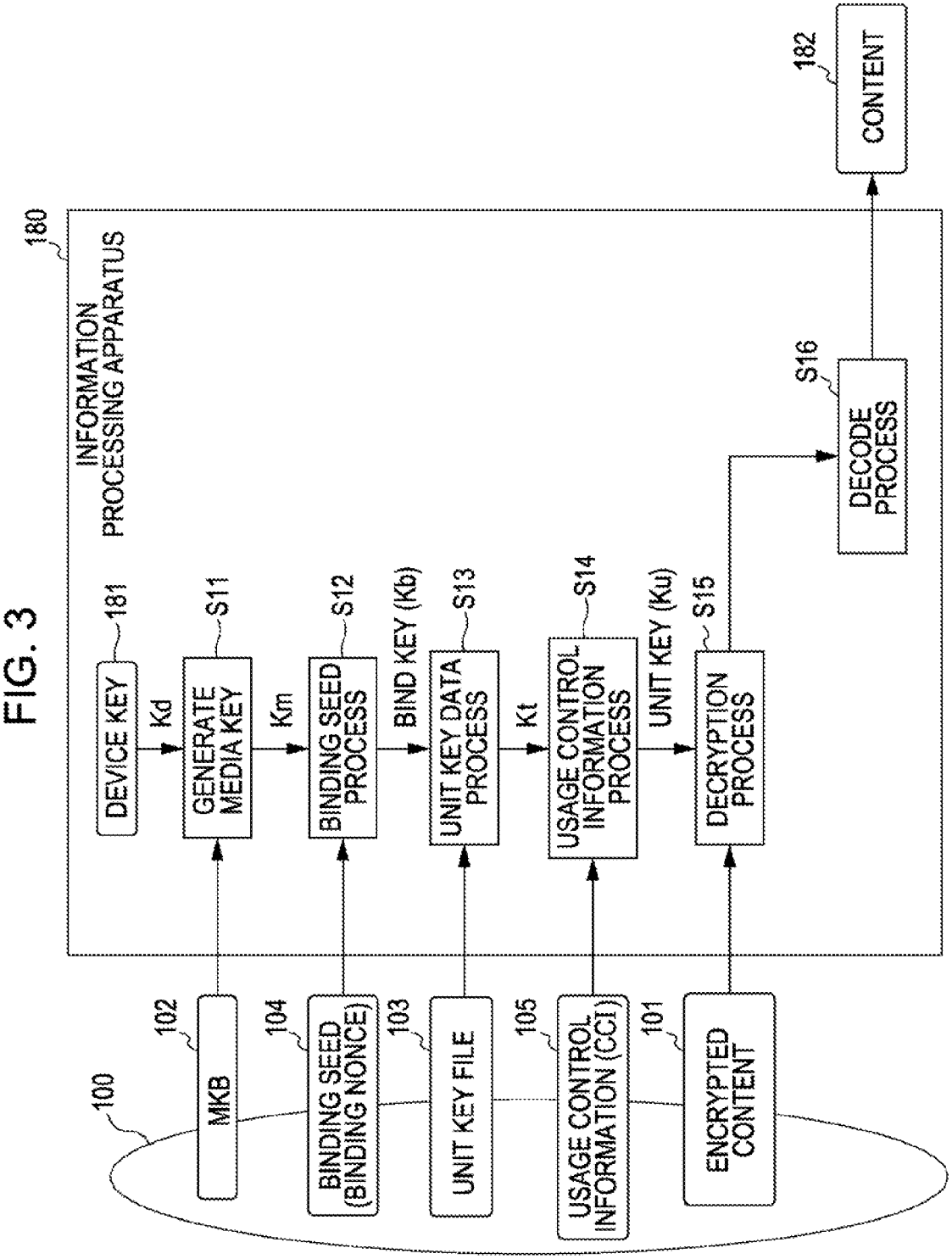

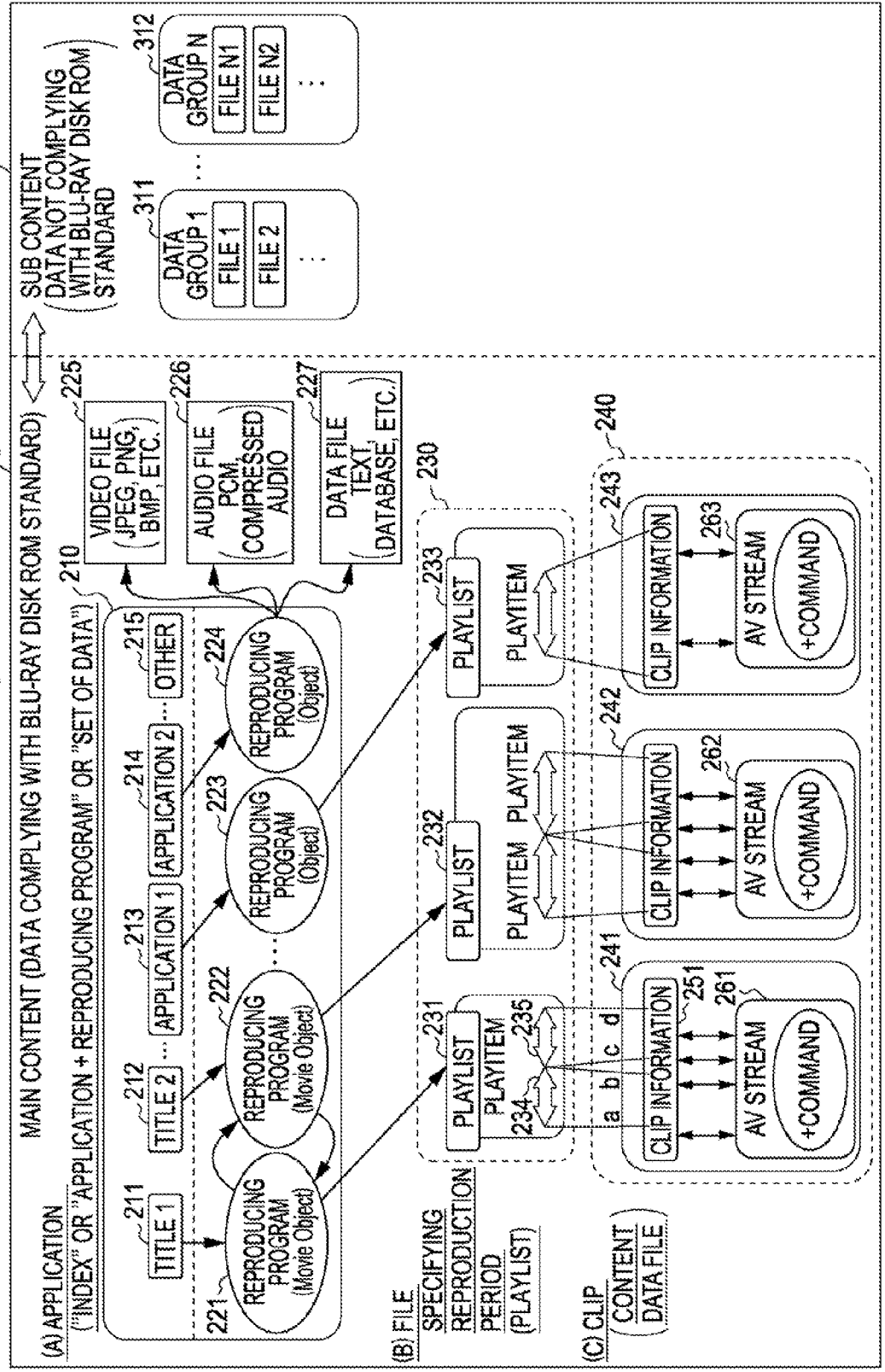

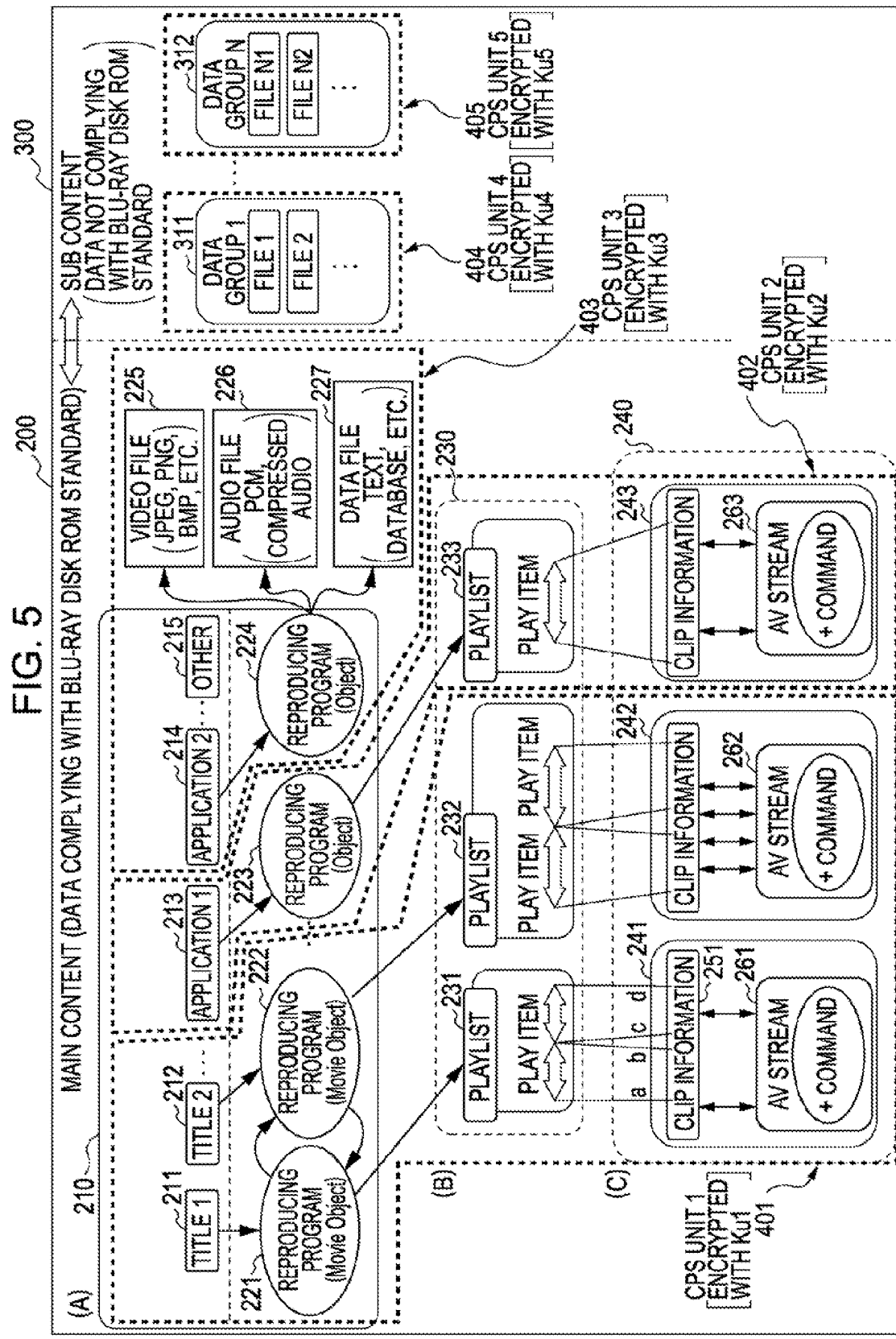

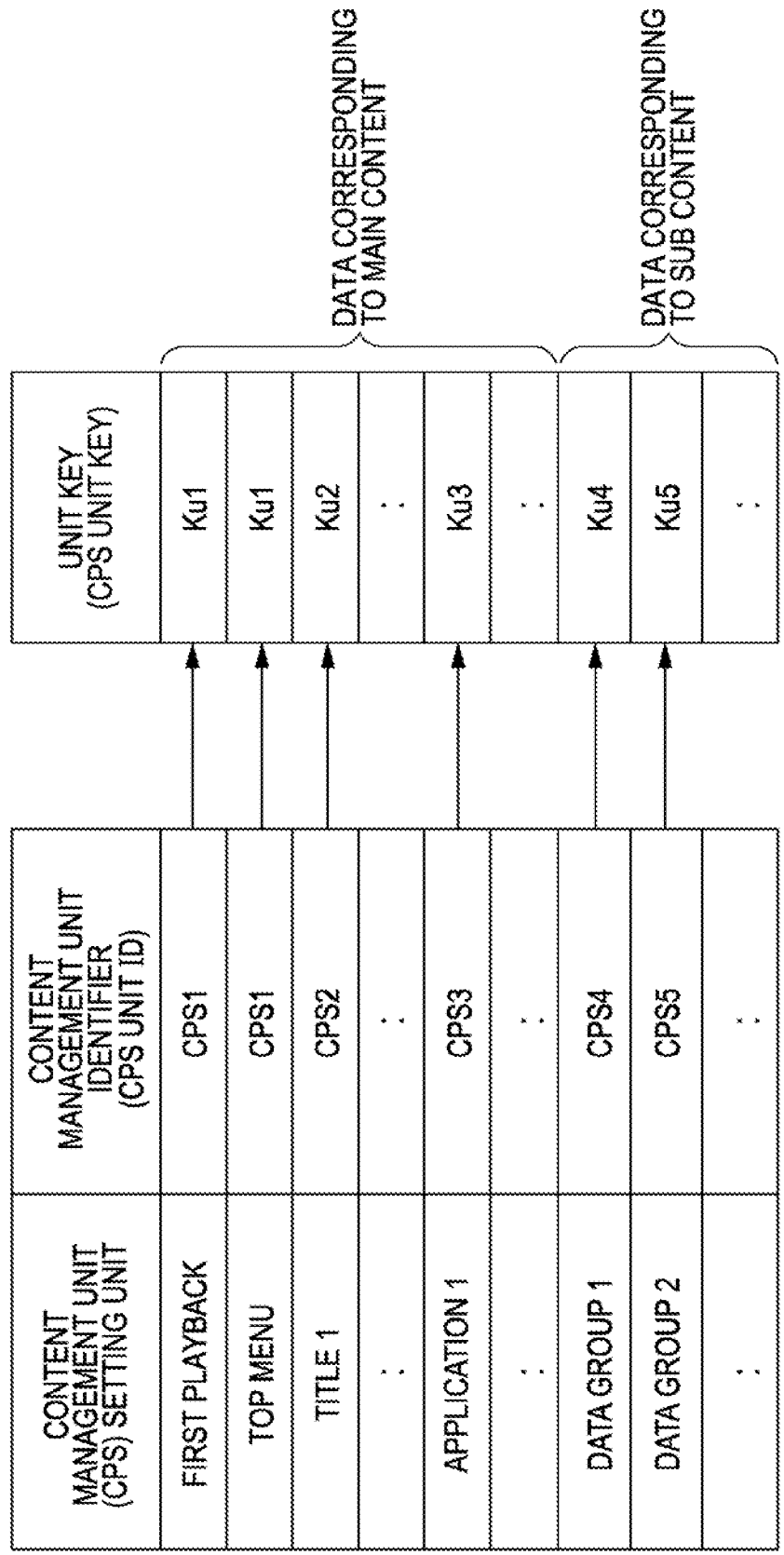

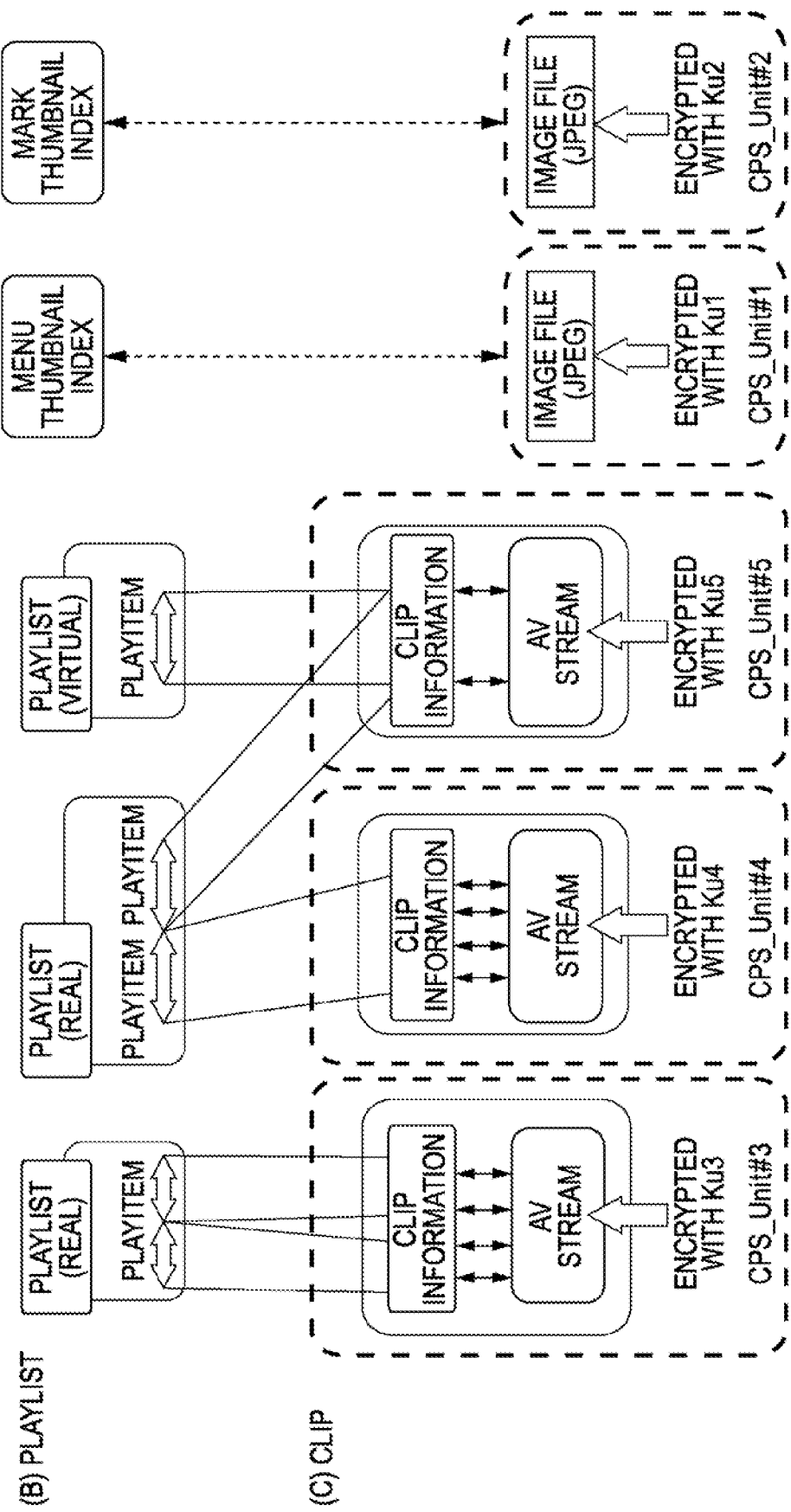

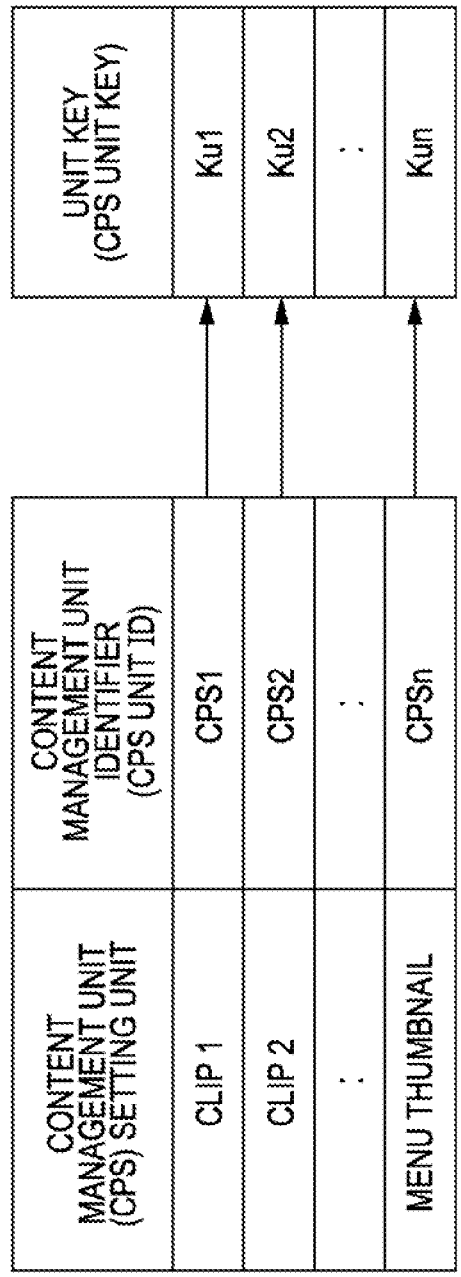

FIG. 9

| Syntax |
|---|
| CPS Unit Key File { |
| Unit_Key_Block_start_address |
| Reserved for future use |
| Unit_Key_File_Header() |
| For (I=0 ; I<X ; I++){ |
| padding word#I |
| } |
| Unit_Key_Block() |
| For (J=0 ; J<Y ; J++){ |
| padding word |
| } |
| } |

421: Unit_Key_File_Header() through padding word#I section
422: Unit_Key_Block() through padding word section Unit_Key_Block_start_address: INDICATING START POSITION OF Unit_Key_Block
Unit_Key_Block() SET TO BE ALIGNED BY 16 BYTES

FIG. 10A

| Syntax |
|---|
| Unit_Key_File_Header(){ |
| Application_Type (= 2_{16}) |
| Num_of_BD_Directory |
| For(I=0; I < Num_of_BD_Directory; I++){ |
| CPS_Unit_number for Menu Thumbnail#I |
| CPS_Unit_number for Mark Thumbnail#I |
| Num_of_Clip#I |
| For(J=0; J < Num_of_Clip; J++){ |
| Clip_ID#J in Directory #I |
| CPS_Unit_number for Title#J in Directory #I |
| } |
| } |

FIG. 10B

| Syntax |
|---|
| Unit_Key_Block(){ |
| Num_of_CPS_Unit |
| Reserved |
| For(I=0; I < Num_of_CPS_Unit; I++){ |
| MAC of Usage Rules#I |
| MAC of Media ID#I |
| Encrypted CPS Unit Key for CPS Unit#I |
| } |
| } |

FIG. 15A

| Syntax |
|---|
| Unit_Key_File_Header(){ |
| Application_Type (= 3₁₆) |
| Num_of_BD_Directory |
| For(I=0; I < Num_of_BD_Directory; I++){ |
| CPS_Unit_number for Menu Thumbnail#I |
| CPS_Unit_number for Mark Thumbnail#I |
| Num_of_Clip#I |
| For(J=0; J < Num_of_Clip; J++){ |
| Clip ID#J in Directory #I |
| CPS_Unit_number for Title#J in Directory #I |
| } |
| } |

FIG. 15B

| Syntax |
|---|
| Unit_Key_Block(){ |
| Num_of_CPS_Unit |
| Reserved |
| For(I=0; I < Num_of_CPS_Unit; I++){ |
| MAC of Usage Rules#I |
| MAC of Media ID#I |
| Encrypted CPS Unit Key for CPS Unit#I |
| } |
| } |

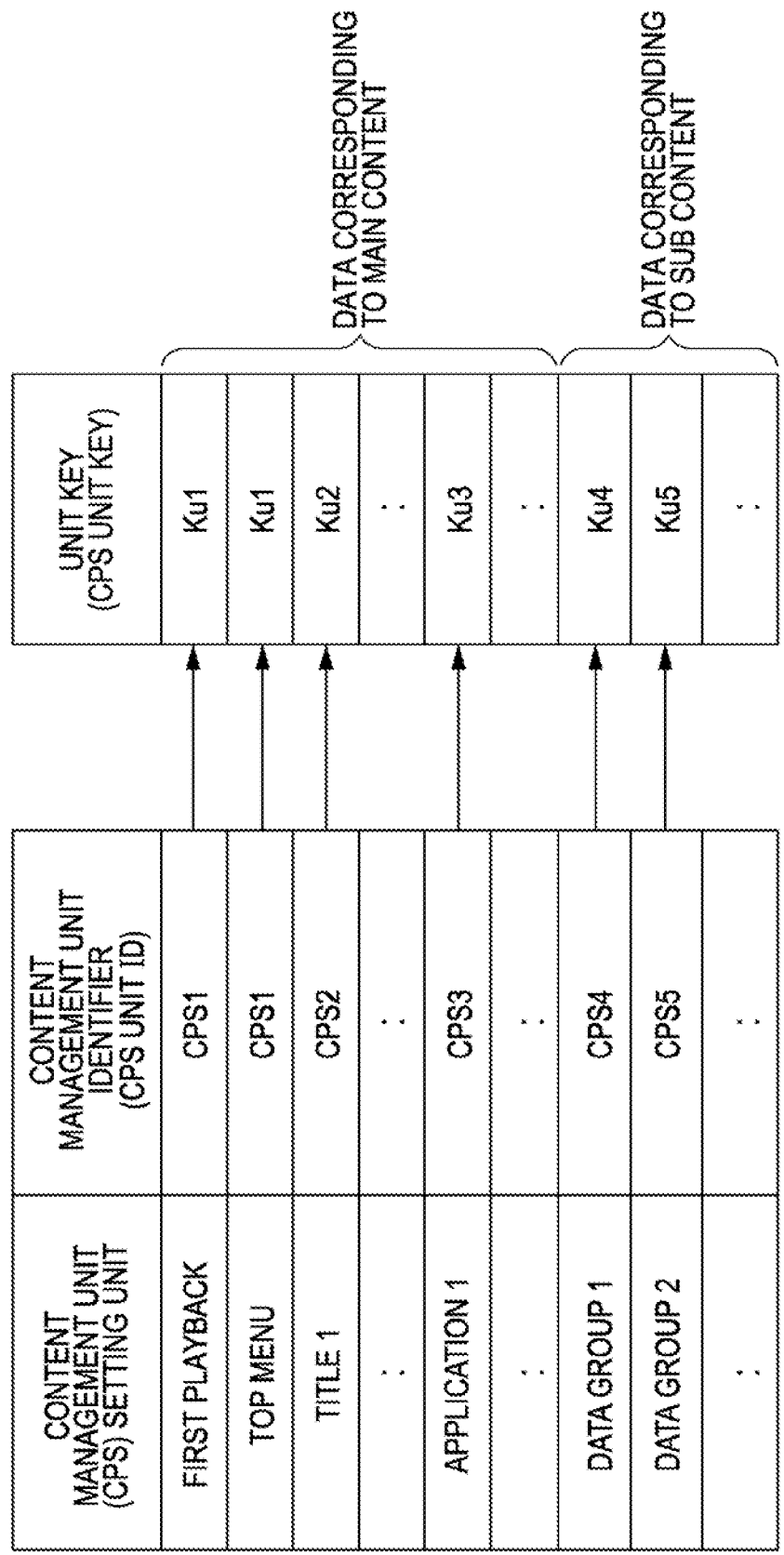

FIG. 19A

| Syntax |
|---|
| Unit_Key_File_Header(){ |
| Application Type (=4) |
| Num_of_BD_Directory (=1) |
| For(I=0; I < Num_of_BD_Directory; I++){ |
| CPS_Unit_number for FirstPlay |
| CPS_Unit_number for TopMenu |
| Num_of_Title in Directory#I |
| For(J=0, J < Num_of_Title in Directory#I; J++){ |
| Title_number#J in Directory #I |
| CPS_Unit_number for Title#J in Directory #I |
| } |
| } |

FIG. 19B

| Syntax |
|---|
| Unit_Key_Block(){ |
| Num_of_CPS_Unit |
| Reserved |
| For(I=0; I < Num_of_CPS_Unit; I++){ |
| MAC of Usage Rules#I |
| MAC of Media ID#I |
| Encrypted CPS Unit Key for CPS Unit#I |
| } |
| } |

APPARATUS, METHOD, AND COMPUTER PROGRAM FOR PROCESSING INFORMATION AND RECORDING MEDIUM STORING COMPUTER PROGRAM

CROSS REFERENCES TO RELATED APPLICATIONS

The present invention contains subject matter related to Japanese Patent Application JP 2006-244908 filed in the Japanese Patent Office on Sep. 9, 2006, the entire contents of which are incorporated herein by reference.

BACKGROUND OF THE INVENTION

1. Field of the Invention

The present invention relates to an apparatus, method, computer program and recording medium for processing information. More specifically, the present invention relates to an apparatus, method, computer program and recording medium for allowing content to be used by delimitation unit in the use of content recorded on an information recording medium.

2. Description of the Related Art

Digital versatile discs (DVDs) and Blu-Ray Disc (Registered Trademark) are currently used as recording media of content such as music and movies. Such information recording media contain a random-access memory (ROM) type medium that does not permit new data to be recorded and a recordable (R) or re-writable (RE) type medium that permits data to be recorded. Using a data rewritable information recording medium, a user may record content received via a network or broadcasting.

Creators or sellers of broadcast content, music data, image data, typically hold copyright and distribution right. When such content is distributed, certain limitations are imposed on the use of the content. Only an authorized user is permitted to use the content. For example, unauthorized copying is prohibited.

In accordance with one technique of imposing limitations on the use of content, content is encrypted and distributed, and only an authorized user or an authorized device is permitted to decrypt the encrypted content for use. Japanese Unexamined Patent Application Publication No. 2003-116100 discloses a technique of controlling the use of content, for example.

Advanced access content system (AACS) is available as standard related to content copyright protection technique based on encryption of content. In accordance with the AACS standard, the content is segmented into units, each unit is encrypted with a respective unit key, and the encrypted unit is then stored on a disk. A unit key file containing a unit key is recorded on the disk as a file containing encrypted unit key. Furthermore, a media key block (encryption key block) is recorded on the disk.

The MKB is an encryption key block that is generated in accordance with a tree-structured key distribution method known as one of broadcast encryption schemes. A media key Km can be acquired only through a decryption process in accordance with a device key Kd stored on an information processing apparatus of a user who has an effective license. Using the media key Km, an encryption unit key contained in the encrypted unit key file is decrypted. The unit key is thus obtained. Using the unit key, the encrypted content is decrypted.

The content is segmented into units, and the units are encrypted with the unit keys different from unit to unit assigned thereto. The use of the content is thus controlled on a per unit basis.

A variety of types of information processing apparatuses and content recording media are available. For example, the recording media include a read-only memory (ROM) type medium permitting only data reproduction, and recordable type (R type) and re-writable type (RE type) media permitting data to be written. The information processing apparatuses using content also include a reproducing only apparatus, and a recording and reproducing apparatus.

A variety of apparatuses and media currently available allows content to be used in a variety of applications. For example, the ROM type disk is free from recording of new content or deletion of recorded content, the content or key information recorded on the disk is fixed and not updated. On the other hand, in the R or RE type medium permitting data to be rewritten, the content recorded on the disk is not fixed. New content may be recorded, and recorded content may be deleted or updated. Along with data updating, a unit key may be added or deleted.

New content may be recorded on a disk in a variety of methods. For example, broadcast content may be recorded on a real-time basis, or content may be downloaded from a content server. In this way, there is a variety of types of information processing apparatuses and media, and content is used in a variety of methods. There is a need for performing an optimum usage control for a variety of content usages.

SUMMARY OF THE INVENTION

It is thus desirable to provide an information processing apparatus, information processing method, information recording medium, and computer program for controlling content usage in response to a variety of types of information processing apparatuses and recording media.

In accordance with one embodiment of the present invention, an information processing apparatus for reproducing content recorded on an information recording medium, contains a recording medium controller for reading data recorded on the information recording medium, and a data processor for acquiring from a unit key file recorded on the information recording medium a unit key corresponding to a content management unit set as a usage control unit of content, and decrypting encrypted content recorded on the information recording medium using the acquired unit key. The data processor determines an application type of the encrypted content recorded on the information recording medium, and acquiring the unit key and decrypting the encrypted content in accordance with a process sequence corresponding to the application type.

The data processor may determine whether the information recording medium is of a read-only memory type disk that does not permit data to be re-written thereon, and if the information recording medium is of a disk type that permits data to be re-written thereon, determine the application type of the encrypted content recorded on the information recording medium, thereby acquiring the unit key and decrypting the encrypted content in accordance with the process sequence corresponding to the application type.

The data processor may determine whether to examine a content certificate, indicating authenticity of the content, in response to determination information of the application type of the encrypted content recorded on the information recording medium.

The data processor may determine whether the application type of the encrypted content recorded on the information recording medium supports real-time recording content, and acquire from the unit key file the unit key corresponding to the content management unit as a clip as a unit, the clip being defined as a content storage file in a content recording format, and decrypt the encrypted content recorded on the information recording medium using the acquired unit key if the application type is determined to support the real-time recording content.

The data processor may determine whether the application type of the encrypted content recorded on the information recording medium supports downloaded content, and acquire from the unit key file the unit key corresponding to the content management as a title as a unit, the title being defined in a content recording format, and decrypt the encrypted content recorded on the information recording medium using the acquired unit key if the application type is determined to support the downloaded content.

Upon determining that the application type of the encrypted content recorded on the information recording medium supports the downloaded content, the data processor may acquire the unit key using at least one of a content certificate set as information corresponding to the downloaded content and server bind process information when the unit key is acquired by decrypting an encrypted unit key contained in the unit key file.

The data processor may generate an encryption key using a seed as key generation information acquired from the information recording medium, and acquire the unit key by decrypting the encrypted unit key contained in the unit key file using the generated encryption key.

The data processor may decrypt the encrypted unit key contained in unit key file using an encryption key that is generated by encrypting the seed using a media key, the media key being acquired through an encryption key block process using a device key stored on the information processing apparatus.

In accordance with one embodiment of the present invention, an information processing apparatus for recording information on an information recording medium, contains a data processor for generating encrypted content by encrypting content to be recorded on the information recording medium using a unit key corresponding to a content management unit as a usage control unit of content, and for generating an encrypted unit key file by encrypting the unit key. The data processor determines an application type of the content to be recorded on the information recording medium, and encrypts the unit key and the content in accordance with a process sequence corresponding to the application type.

The data processor may determine whether the application type of the encrypted content to be recorded on the information recording medium supports real-time recording content, and using the unit key, encrypt the content management as a clip as a unit, the clip being defined as a content storage file in a content recording format if the application type is determined to support the real-time recording content.

The data processor may determine whether the application type of the encrypted content to be recorded on the information recording medium supports downloaded content, and using the unit key, encrypt the content management unit as a title as a unit, the title being defined in a content recording format if the application type is determined to support the downloaded content.

Upon determining that the application type of the encrypted content to be recorded on the information recording medium supports the downloaded content, the data processor may encrypt the unit key using at least one of a content certificate set as information corresponding to the downloaded content and server bind process information when the unit key to be recorded in the unit key file is encrypted.

The data processor may generate an encryption key using a seed as key generation information, and encrypt the unit key to be recorded in the unit key file based on the generated encryption key.

The data processor may encrypt the unit key to be recorded in the unit key file using an encryption key that is generated by encrypting the seed using a media key, the media key being acquired through an encryption key block process using a device key stored on the information processing apparatus.

In accordance with one embodiment of the present invention, an information recording medium records a content management unit, as a usage control unit of content, containing data being encrypted using a unit key corresponding to each content management unit, a unit key file containing the unit key with one of the unit key file and file data thereof encrypted with an encryption key, the encryption key being generated using a seed having a value that is updated with a modification in the unit key contained therein, the seed, a content certificate for proving authenticity of the content, and server bind process information containing identification information of a content providing server.

The information recording medium may further record a content hash table containing a hash value of the content.

The information recording medium may further record a revocation list as an effectiveness determination list of a public key certificate of an information processing apparatus.

The server bind process information may contain identification information of the content providing server, and be tagged with an electronic signature of an administrator.

In accordance with one embodiment of the present invention, a data structure of data, contains a content management unit, as a usage control unit of content, containing data being encrypted using a unit key corresponding to each content management unit, a unit key file containing the unit key with one of the unit key file and file data thereof encrypted with an encryption key, the encryption key being generated using a seed having a value that is updated with a modification in the unit key contained therein, the seed, a content certificate for proving authenticity of the content, and server bind process information containing identification information of a content providing server.

In accordance with one embodiment of the present invention, an information processing method for reproducing content recorded on an information recording medium, includes steps of reading data recorded on the information recording medium, and processing data by acquiring from a unit key file recorded on the information recording medium a unit key corresponding to a content management unit set as a usage control unit of content, and by decrypting encrypted content recorded on the information recording medium using the acquired unit key. The data processing step includes determining an application type of the encrypted content recorded on the information recording medium, and acquiring the unit key and decrypting the encrypted content in accordance with a process sequence corresponding to the application type.

The data processing step may include determining whether the information recording medium is of a read-only memory type disk that does not permit data to be re-written thereon, and if the information recording medium is of a disk type that permits data to be re-written thereon, determining the application type of the encrypted content recorded on the information recording medium, and acquiring the unit key and decrypting the encrypted content in accordance with the process sequence corresponding to the application type.

The data processing step may include determining whether to examine a content certificate, indicating authenticity of the content, in response to determination information of the application type of the encrypted content recorded on the information recording medium.

The data processing step may include determining whether the application type of the encrypted content recorded on the information recording medium supports real-time recording content, and acquiring from the unit key file the unit key corresponding to the content management unit as a clip as a unit, the clip being defined as a content storage file in a content recording format, and decrypting the encrypted content recorded on the information recording medium using the acquired unit key if the application type is determined to support the real-time recording content.

The data processing step may include determining whether the application type of the encrypted content recorded on the information recording medium supports downloaded content, and acquiring from the unit key file the unit key corresponding to the content management unit as a title as a unit, the title being defined in a content recording format, and decrypting the encrypted content recorded on the information recording medium using the acquired unit key if the application type is determined to support the downloaded content.

If the application type of the encrypted content recorded on the information recording medium is determined to support the downloaded content, the data processing step may include acquiring the unit key using at least one of a content certificate set as information corresponding to the downloaded content and server bind process information when the unit key is acquired by decrypting an encrypted unit key contained in the unit key file.

The data processing step may include generating an encryption key using a seed as key generation information acquired from the information recording medium, and acquiring the unit key by decrypting the encrypted unit key contained in the unit key file using the generated encryption key.

The data processing step may include decrypting the encrypted unit key contained in unit key file using an encryption key that is generated by encrypting the seed using a media key, the media key being acquired through an encryption key block process using a device key stored on an information processing apparatus.

In accordance with one embodiment of the present invention, an information processing method for recording information on an information recording medium, includes a step of processing data for generating encrypted content by encrypting content to be recorded on the information recording medium using a unit key corresponding to a content management unit as a usage control unit of content, and for generating an encryption unit key file by encrypting the unit key. The data processing step includes determining an application type of the content to be recorded on the information recording medium, and encrypting the unit key and the content in accordance with a process sequence corresponding to the application type.

The data processing step may include determining whether the application type of the encrypted content to be recorded on the information recording medium supports real-time recording content, and using the unit key, encrypting the content management unit as a clip as a unit, the clip being defined as a content storage file in a content recording format if the application type is determined to support the real-time recording content.

The data processing step may include determining whether the application type of the encrypted content to be recorded on the information recording medium supports downloaded content, and using the unit key, encrypting the content management unit as a title as a unit, the title being defined in a content recording format if the application type is determined to support the downloaded content.

If the application type of the encrypted content to be recorded on the information recording medium is determined to support the downloaded content, the data processing step may include encrypting the unit key using at least one of a content certificate set as information corresponding to the downloaded content and server bind process information when the unit key to be recorded in the unit key file is encrypted.

The data processing step may include generating an encryption key using a seed as key generation information, and encrypting the unit key to be recorded in the unit key file based on the generated encryption key.

The data processing step may include encrypting the unit key to be recorded in the unit key file using an encryption key that is generated by encrypting the seed using a media key, the media key being acquired through an encryption key block process using a device key stored on an information processing apparatus.

In accordance with one embodiment of the present invention, a computer program for causing a computer to reproduce content recorded on an information recording medium, includes steps of reading data recorded on the information recording medium, and processing data by acquiring from a unit key file recorded on the information recording medium a unit key corresponding to a content management unit set as a usage control unit of content, and by decrypting encrypted content recorded on the information recording medium using the acquired unit key. The data processing step contains determining an application type of the encrypted content recorded on the information recording medium, and acquiring the unit key and decrypting the encrypted content in accordance with a process sequence corresponding to the application type.

In accordance with one embodiment of the present invention, a computer program for causing a computer to record information on an information recording medium, includes a step of processing data for generating encrypted content by encrypting content to be recorded on the information recording medium using a unit key corresponding to a content management unit as a usage control unit of content, and for generating an encrypted unit key file by encrypting the unit key. The data processing step includes determining an application type of the content to be recorded on the information recording medium, and encrypting the unit key and the content in accordance with a process sequence corresponding to the application type.

The computer program of embodiments of the present invention may be supplied in a computer-readable storage media or communication media to a computer system executing a variety of program codes. The storage media include recording media such as digital versatile disks (DVDs), compact disks (CDs), or magneto-optical disks (MOs). The communication media include a network. By supplying the computer program in a computer readable format, the computer system performs a process in accordance with the program.

These and other purposes, features and advantages of the present invention will be apparent from the following detailed description of embodiments and the accompanying drawings. In the specification, the word system refers to a logical set of a plurality of apparatuses and is not limited a single casing apparatus that houses a variety of elements.

In accordance with embodiments of the present invention, the content usage is controlled based on the content management unit (CPS unit) set as the usage control unit of content. During recording or reproducing process of the content, the application type is determined, and data is then recorded or reproduced in a process supported by each application type. More specifically, an application type supporting real-time recording content and an application type supporting downloaded content are set up. A unit key and a content management unit are set in response to the content type. Flexible content usage control complying with each content type is thus performed.

BRIEF DESCRIPTION OF THE DRAWINGS

FIG. 3 illustrates an example of a reproducing sequence of content recorded on the information recording medium;

FIG. 4 illustrates a content structure of a type 1 application;

FIG. 5 illustrates a structure of a content management unit (CPS unit) of the type 1 application;

FIG. 6 illustrates the set content management unit (CPS unit) of the type 1 application and the set unit key;

FIG. 7 illustrates the structure of a content management unit (CPS unit) of a type 2 application;

FIG. 8 illustrates the set content management unit (CPS unit) of the type 2 application and the set unit key;

FIG. 9 illustrates a data structure of a unit key file;

FIGS. 10A and 10B illustrate a data structure of a unit key file of the type 2 application;

FIGS. 15A and 15B illustrate a data structure of a unit key file of the type 3 application;

FIG. 18 illustrates a setting structure of the content management unit (CPS unit) of a type 4 application;

FIGS. 19A and 19B illustrate a data structure of a unit key file of the type 4 application;

DESCRIPTION OF THE PREFERRED EMBODIMENTS

An information processing apparatus, an information processing method, an information processing computer program and an information recording medium in accordance with embodiments of the present invention are described below.

Types of data recorded on the information recording medium (disk) complying with advanced access content system (AACS) and a reproducing process sequence of content are described first.

Figure 1:
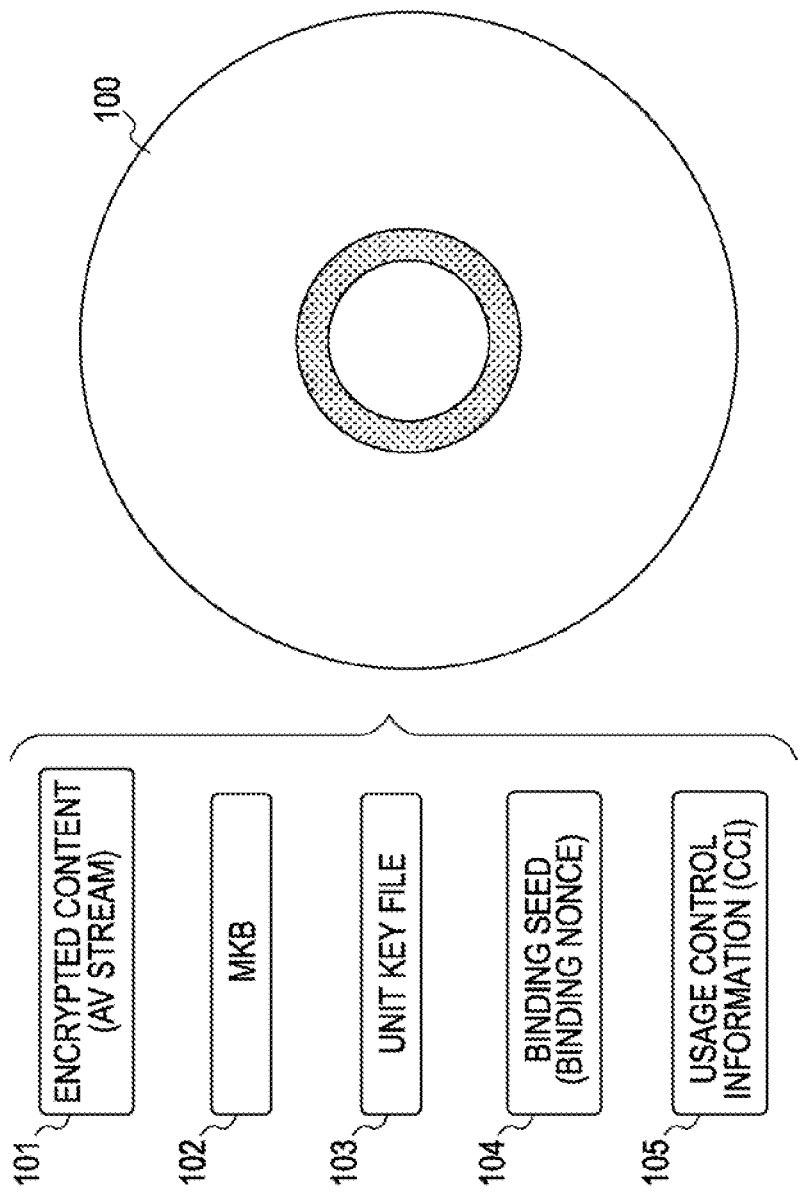
FIG. 1 illustrates data stored on an information recording medium.

Data recorded on an information recording medium 100 of FIG. 1 is described. The information recording medium 100 is one of a Blu-ray Disk (Registered Trademark) and a digital versatile disk (DVD), for example. The information recording medium 100 records content to be copyright protected, and a variety of data that allows AACS based content to be used.

As shown in FIG. 1, the information recording medium 100 stores content 101 that is encrypted and partly re-written, a media key block (MKB) 102 generated as an encryption key block in accordance with a tree-structured key distribution system known as one of broadcast encryption methods, a unit key file 103 composed of encrypted CPS unit key that is obtained by encrypting a unit key for use in content decryption process, a binding seed (binding nonce) 104 serving as generation information of key applied to encryption of the unit key contained in the unit key file 103, and usage control information 105 containing copy control information (CCI) as copy and reproduction control information of the content.

The data stored on the information recording medium 100 is shown for exemplary purposes only, and may be slightly different from disk type to disk type. The data of these types may be further described.

The information recording medium 100 stores a variety of content. For example, the information recording medium 100 stores an audio-visual (AV) stream of high-definition (HD) movie content as high-definition image data, a game playing program defined in a particular standard, an image file, audio data, text data, etc. These pieces of content are particular AV format standard data and stored in accordance with a particular AV data format.

Content to be stored on the information recording medium is divided into delimitation units. The delimitation units of the content are assigned different keys (referred to as CPS unit key or unit key or sometimes referred to as a title key) and encrypted with the assigned keys in order to perform usage control different from delimitation unit to delimitation unit. Each unit of the content is referred to as a content management unit (or CPS unit).

The MKB 102 is an encryption key block that is generated in accordance with a tree-structured key distribution scheme known as one of broadcast encryption methods. The MKB 102 allows a media key Km required to decrypt the content to be acquired in accordance with only a decrypting process based on a device key Kd stored on an information processing apparatus of user having an effective license. Information distribution is performed in accordance with a layered tree structure. Only when the user device (information processing apparatus) has an effective license, the media key Km is acquired. Any revoked user device cannot acquire the media key Km.

A management center as a license entity can modify a device key for use in encryption of key information to be stored on the MKB 102. The management center can thus make difficult decryption with a device key stored on a particular user device, i.e., generate a MKB structured so that a media key required for content decryption may not be acquired. The management center can revoke an authorized device at any timing, and supply decryptable encrypted content to a device having an effective license. The decryption process of the content will be described later.

Each piece or a set of pieces of content may be encrypted with individual encryption keys (CPS units) for usage management and then stored on the information recording medium 100. More specifically, AV stream, music data, image data such as moving image and still image, game playing program, and WEB content, forming the content, are delimited into units as management units of content usage, and then encrypted with unit keys generated for respective delimitation units. Information required to generate the unit key is a CPS unit key. A file storing the CPS unit key is the unit key file. The unit key in the unit key file is recorded as encrypted data.

Only when a user device (information processing apparatus) has an effective license, decryption becomes possible with the media key Km acquired from the MKB 102 and the binding seed 104 of FIG. 1. Decryption sequence will be described later.

The binding seed 104 is information for use in encryption of the unit key recorded in the unit key file 103. The binding seed 104 is also applied to decryption of the encrypted unit key in the unit key file 103. By decrypting the encrypted unit key, the unit key is acquired. The content is then decrypted using the acquired unit key. The binding seed 104 may be distributed and used in a variety of methods. For example, the binding seed 104 may be distributed as a binding nonce, or may be recorded in the CPS unit key file or any other file for distribution.

Rather than being fixed data, the binding seed 104 may be modified in accordance with modification of the structure of a unit key stored in the unit key file. For example, when a CPS unit #2 is additionally recorded on an information recording medium having recorded a CPS unit #1, the CPS unit key file is updated to be a file containing both the CPS unit #1 and the CPS unit #2, and the binding seed 104 is also modified along with the modification operation.

By successively modifying the binding seed 104 in response to the structure of the unit key file, the correspondence between the CPS unit regularly stored on the information recording medium and the applicable CPS unit key may be strictly managed.

The usage control information 105 contains copy control information (CCI), for example. The CCI is copy restriction information and reproduction restriction information for controlling usage of the encrypted content 101 stored on the information recording medium 100. The CCI may be set in a variety of manners. For example, the CCI may be set for respective CPS units as the control management unit or may be collectively set for a plurality of CPS units.

A content management structure of the content management unit (CPS unit) is described with reference to FIG. 2. The content is encrypted with a different key assigned to each unit and then stored on the information recording medium 100 so that usage control different from unit to unit is performed. More specifically, the content is delimited into content management units (CPS units), and each content management unit is encrypted with a different key (unit key or CPS unit key) so that the content is managed on a per unit basis.

To use the content, the CPS unit key assigned to each unit needs to be acquired. The content is processed for reproduction in accordance with a predetermined decryption sequence using other required keys and key generation information.

The content management unit (CPS unit) may be set in a variety of manners as follows:

(a) Structure of data recorded in BDMV format on ROM type disk and content usage application (type 1 application)

(b) Structure of data recorded in BDAV format on RE or R type disk and content usage application (type 2 application)

(c) Structure of data recorded on a real-time basis in BDMV format on ROM type disk and content usage application (type 3 application)

(d) Structure of data downloaded and recorded in BDMV format on ROM type disk and content usage application (type 4 application)

The setting of the unit in response to the application will be described later in detail. For understanding of the concept of the setting of the unit, one setting example of the content management unit (CPS unit) is described below with reference to FIG. 2.

Figure 2:
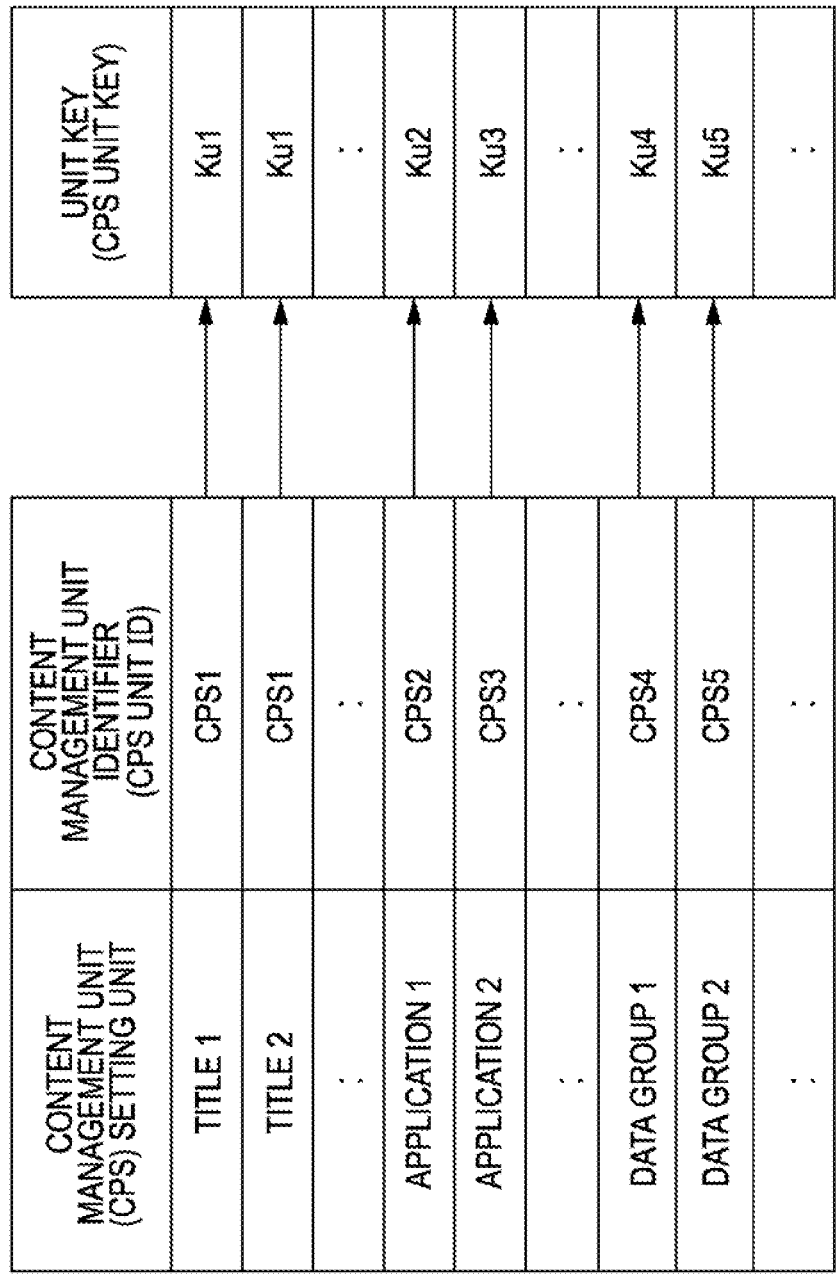
FIG. 2 illustrates a relationship between a unit setting structure of the stored data and a unit key.

As shown in FIG. 2, the content management units (CPS units) are set for titles and applications indicating a variety of pieces of content including moving image content and still image content. A content management unit identifier (CPS unit ID) is set on a per CPS unit setting unit, and each CPS unit is assigned a different unit key (CPS unit key) as an encryption key. Each CPS unit is encrypted with a respective CPS unit key. During decryption, the CPS unit key of the content to be decrypted needs to be acquired from the CPS unit key file.

With reference to FIG. 3, a content use (reproduction) sequence using information recorded on the information recording medium 100 is described.

An information processing apparatus 180 reads a device key Kd 181 stored on a memory. A device key 181 is a secret key stored on the information processing apparatus 180 licensed to use the content.

In step S11, the information processing apparatus 180 decrypts the MKB 102 as an encryption key block containing the media key Km stored on the information recording medium 100, thereby obtaining the media key Km. A media key block (MKB) 171 is an encryption key block that is generated in accordance with the tree-structured key distribution scheme as one of broadcast encryption methods. The MKB 102 allows the media key Km required to decrypt the content to be obtained from only a decryption process based on the device key Kd stored on the information processing apparatus 180 having an effective license. Information distribution is performed in accordance with the layered tree structure. Only when the user device (information processing apparatus) has an effective license, the media key Km is acquired. Any revoked user device cannot acquire the media key Km.

In step S12, a bind key Kb as an encryption key is generated through an encryption process based on the media key Km acquired in step S11 and the binding seed 104 read from the information recording medium 100. This key generation process may be performed in accordance with an advanced encryption standard (AESE) encryption algorithm.

The encryption key directly used to encrypt the encryption unit key contained in CPS unit key file is the bind key Kb. Encryption key generation information applied to the bind key Kb is the bind seed.

In step S13, the encryption unit key contained in the CPS unit key file 103 read from the information recording medium 100 is decrypted with the bind key Kb. The CPS unit key file 103 contains encrypted data of a unit key (Kun) set for each CPS unit. The unit key file will be specifically described later. The unit key is stored as encrypted data such as [Enc(Kb,f (Ku_n, CCI))]. Enc(a,b) represents data b that has been encrypted using a key a.

Data (Kt)=f(Ku_n,CCI) is acquired by decrypting the encrypted unit contained in the CPS unit key file 103 in step S13. In step S14, the unit key [Ku_n] is obtained by performing a calculation process to the data [Kt]=f(Ku_n,CCI) using the usage control information (CCI) 105 read from the information recording medium 100.

For example, if the data [Kt]=f(Ku_n,CCI) is obtained by exclusive OR gating the unit key [Ku_n] and the usage control information (CCI) 105, the unit key [Ku_n] can be obtained by exclusive OR gating again the logical result and the usage control information (CCI) 105 read from the information recording medium 100.

In step S15, a decryption process (such as AES_D) with the unit key [Ku_n] is performed on the encrypted content 101 read from the information recording medium 100. In step S16, required decoding processes, such as MPEG decoding process, decompression, and descrambling may be performed to obtain content 182.

Through the above process, the encrypted content managed as the CPS unit stored on the information recording medium 100 is decrypted and used, i.e., reproduced.

Recorded data structure in accordance with content usage and a content usage application are described. As previously discussed, a variety of devices (information processing apparatuses) using content and a variety of information recording media recording content are available. For example, the recording media include a read-only memory (ROM) type medium permitting only data reproduction, and recordable type (R type) and re-writable type (RE type) media permitting data to be written. The information processing apparatuses using content also include a play only apparatus, and a recording and reproducing apparatus. New content may be recorded on the disk in a variety of processes. For example, broadcast content may be recorded on a real-time basis, or content may be downloaded from a content server.

A variety of media and information processing apparatuses is thus available and a variety of content usages is also available. There is a need for setting up an optimum usage control configuration in response to each of a variety of content usages. The configuration of the unit (CPS unit) to perform content usage control in response to a variety of content usages is described below. The application to perform a content usage process is also described below.

The following two application standards are defined for Blu-ray Disc (Registered Trademark).

(a) Structure of data recorded in BDMV format on ROM type disk and content usage application (type 1 application)

(b) Structure of data recorded in BDAV format on RE or R type disk and content usage application (type 2 application)

In addition to the above two application standards, the following two configurations that might be standardized are proposed herein:

(c) Structure of data recorded on a real-time basis in BDMV format on ROM type disk and content usage application (type 3 application)

(d) Structure of data downloaded and recorded in BDMV format on ROM type disk and content usage application (type 4 application)

The existing standards (a) and (b) are first summarized and then the two configurations (c) and (d) proposed herein are described.

(a) Structure of data recorded in BDMV format on ROM type disk and content usage application (type 1 application)

The existing type 1 application is described below.

The BDMV (Blu-ray Disc Movie) is an application standard for a reproducing only disc as Blu-ray Disc (Registered Trademark). The format of data recorded on the disk complying with the BDMV standard is described below with reference to FIG. 4.

As shown in FIG. 4, the information recording medium 100 stores as main content 200 an audio-visual (AV) stream of moving content such as high-definition movie content, and further as sub content 300 other data and programs including a game playing program, an image file, audio data and text data.

At least the main content 200 as BDMV content is stored as Blu-ray Disc (Registered Trademark) ROM standard data in the BDMV format. As shown in FIG. 4, the BDMV content contains, as real content to be reproduced, moving image content (AV stream), and has a layered structure complying with the Blu-ray Disc ROM standard format. More specifically, the BDMV content contains (A) application 210, (B) reproducing period specifying file (playlist) 230, and (C) clip (content data file) 240.

The clip (content data file) 240 contains clips 241, 242 and 243 as delimited content data files. The clip 241 contains an AV stream file 261 and a clip information file 251.

The clip information file 251 contains attribute information related to the AV stream file 261. The AV stream file 261 is moving picture experts group-transport stream (MPEG-TS) data, and has a data structure in which video, audio and caption data are multiplexed. Command information for controlling the reproducing apparatus during reproduction operation may sometimes be multiplexed.

The reproducing period specifying file (playlist) 230 contains a plurality of reproducing period specifying files (playlists) 231, 232 and 233. Each of the reproducing period specifying files (playlists) 231, 232 and 233 contains at least one playitem for selecting one of a plurality of AV stream data files contained in the clip (content data file) 240, and specifying a play start point and a play end point defining a particular data portion of the selected AV stream data file. By selecting one reproducing period specifying file (playlist) 230, a reproducing sequence is determined and reproduced in accordance with the playitem contained in the selected reproducing period specifying file (playlist) 230.

Content reproducing operation is performed after selecting the reproducing period specifying file (playlist) 231. A playitem 234 corresponding to the reproducing period specifying file (playlist) 231 has a reproducing start point a and a reproducing end point b in the clip 241, and a playitem 235 has a reproducing start point c and a reproducing end point d in the clip 241. When reproducing operation starts with the reproducing period specifying file (playlist) 231 selected, particular data regions of the AV stream file 261 as the content contained in the clip 241 defined by a-b and c-d are reproduced.

The application 210 is constructed as a layer in which application index files 211 and 212 containing content titles displayed on a display performing content reproduction are respectively combined with reproducing programs 221 and 222 and application executing files 213 and 214 such as game playing content and web content are respectively combined with reproducing programs 223 and 224. A user can select a title contained in the application index files 211 and 212.

Each title is mapped to one of reproducing programs 221 through 224 (for example, an movie object). When the user selects one title, the reproducing operation based on the reproducing program mapped to the selected title starts. The application index files 211 and 212 displayed as titles 1 and 2 contain "First Playback" and "Top Menu" as title presentation programs for displaying titles and menus automatically reproduced at the setting and starting of the information recording medium 100.

Each of the application index files 211 and 212 and the application executing files 213 and 214 may contain an application source file for use in application execution. The application source files may include a video file 225 in JPEG, PNG, and BMP, including a variety of data files acquired from the information recording medium 100 or a network connection server, an audio file 226 in PCM or compression Audio, and a variety of data file 227 such as database.

The reproducing programs (movie objects) 221 through 224 programmably provide functions required to display play content (HD movie content). More specifically, the reproducing programs (movie objects) 221 through 224 specify a reproducing period specifying file (playlist) to be reproduced, respond to operation information related to content reproduction operation input by the user, jump between titles, or branch the reproducing sequence. The reproducing programs 221 through 224 jump to each other. In accordance with an input from the user or a predetermined program, a reproducing program to be actually performed is selected. The reproducing period specifying file (playlist) 230 specified by the selected reproducing program selects from the clip 240 content to be reproduced and reproduces the content.

The main content 200 is managed in layered structure in accordance with the BDMV format, and the content management unit (CPS unit) is set up in the layered structure. The content is thus used and managed on a per content management unit (CPS unit) basis. The information recording medium 100 stores the sub content 300 together with the main content 200. The sub content 300 can contain data in any format not complying with the Blu-ray Disc ROM standard format. FIG. 4 illustrates data groups 1-311 through N-312 as the sub content 300. The data group can be also set as content to be used and managed. If the data group is set as content to be used and managed, the content management unit (CPS unit) is set for each data group as a unit. Each data group is thus used and managed.

The type 1 application is described below. In the type 1 application, the content is recorded on the information recording medium 100 in the ROM type disk based BDMV data recording format and the usage of the content is controlled on a per content management unit (CPS unit) basis.

As previously discussed with reference to FIG. 2, each content management unit (CPS unit) is assigned a unit key as an encryption key. A unit assigned a single unit key is a content management unit (CPS unit).

Content belonging to each unit is encrypted with the unit key. To use the content, the encrypted content is decrypted by acquiring the unit key assigned to each unit. The unit keys can be individually managed. For example, a unit key assigned to a unit A may be set as a key acquirable from the information recording medium 100. A unit key assigned to a unit B may be set as a key that can be acquired on condition that the user has accessed a network connected server and completed a predetermined procedure with the server. In this way, the acquisition and management of each unit key may be set to be different from unit key to unit key.

The setting example of the content management unit (CPS unit) defined in the type 1 application is described below with reference to FIG. 5.

The set structure of the content management unit (CPS unit) on the main content 200 is described below. A CPS unit containing the application index files 211 and 212 contained in the application 210 and a CPS unit containing the application executing files 213 and 214 contained in the application 210 are set on the main content 200.

A CPS unit 1-401 of FIG. 5 contains application index files, reproducing program files, playlists, and an AV stream file group as content real data.

A CPS unit 2-402 contains application executing files, reproducing programs, playlists, and an AV stream file group as content real data.

A CPS unit 3-403 contains application executing files, reproducing programs, a data file acquirable from the information recording medium 100 or the network connected server.

The units are encrypted with respective keys (CPS unit keys of Ku1, Ku2 and Ku3 of FIG. 5), and then stored on the information recording medium 100.

As shown in FIG. 5, each of the content management unit (CPS unit) 1-401 and the content management unit (CPS unit) 2-402 is constructed of (A) application in an upper layer and (B) reproducing period specifying file (playlist) and (C) clip (content data file) in a lower layer. The content management unit (CPS unit) 3-403 does not include (B) reproducing period specifying file (playlist) and (C) clip (content data file) in the lower layer. The content management unit (CPS unit) 3-403 contains (A) application at the upper layer and a variety of data files acquirable from the information recording medium 100 or the network connected server, for example, the video file 225, the audio file 226 and the data file 227.

When the content management unit (CPS unit) containing the clip as a member is set in the type 1 application, the content management unit (CPS unit) is set as a unit including (A) application in the upper layer and (B) reproducing period specifying file (playlist) and (C) clip (content data file) in the lower layer.

The content management unit (CPS unit) 1-401 contains the title 1-211, the title 2-212, the reproducing programs 221 and 222, the playlists 231 and 232, and the clips 241 and 242. The AV stream data files 261 and 262 as the real data of the content contained in the two clips 241 and 242 are encrypted with the unit key Ku1 as an encryption key mapped to the content management unit (CPS unit) 1-401.

The content management unit (CPS unit) 2-402 contains the application executing file 213 such as game playing content and web content, the reproducing program 223, the playlist 233 and the clip 243. The AV stream data file 263 as the real data of the content contained in the clip 243 is encrypted with the unit key Ku2 as an encryption key mapped to the content management unit (CPS unit) 2-402. The application executing file 213 may also be encrypted with the unit key Ku2.

The content management unit (CPS unit) 3-403 contains the application files 214 and 215 and the reproducing program 224 in (A) application layer as the upper layer, and a variety of data files acquirable from the information recording medium 100 or the network connected server by the reproducing program 224, including the video file 225 such as JPEG, PNG, or BMP files, the audio file 226 such as a PCM file or a compression Audio file, and the data file 227 such as text, and database.

The content management unit (CPS unit) 3-403 is encrypted with the unit key Ku3 set as an encryption key mapped to the content management unit (CPS unit) 3-403.

To perform an application file or a content reproduction process responsive to the content management unit (CPS unit) 1-401, the unit key Ku1 is obtained by performing an encryption process with a record seed Vu1 mapped to the content management unit (CPS unit) 1-401. A decryption process sequence needs to be performed on the content using the acquired unit key Ku1. Subsequent to the decryption process sequence, the application program is performed to reproduce the content.

The application file mapped to the content management unit (CPS unit) 3-403 may be used, and the video file 225, the audio file 226 such as the PCM file, the compression Audio file, and the variety of data files 227 such as text and database, mapped to the reproducing program 224 may be used. The unit key Ku3 as an encryption key mapped to the content management unit (CPS unit) 3-403 is acquired, and a decryption process is performed with the acquired unit key Ku3. Subsequent to the decryption process, the application program or one of the variety of files is performed.

In the data structure recorded in the ROM type disk based BDMV format, the content management unit (CPS unit) is set to include all layers from the application layer to the clip as shown in the structure of the main content of FIG. 5.

The unit key responsive to the unit setting structure is listed in FIG. 6. As shown in FIG. 6, the CPS unit is set to map to the title, the application, the data group of the sub content, including the "First Playback," "Top Menu" defined in the application layer. Encryption process is performed by unit and usage control is performed.

The scope of encryption may be limited to only real content data in the clip. Application defining the structure of data recorded in the BDMV format is set. In the case of the ROM type disk, the content recorded thereon remains unchanged. The number of titles neither increases nor decreases. Data updating need not be considered. The unit setting in this way is thus accepted.

The structure of data recorded in BDAV format on RE or R type disk and content usage application (type 2 application) are described below.

When a disk permitting data to be recorded thereon is used, the content to be recorded on the disk is subject to data updating, such data addition, deletion and editing. The structure of data recorded in BDAV format on RE or R type disk and the content usage application (type 2 application) provide a mechanism that permits data updating.

The setting structure of the content management unit (CPS unit) defined in the type 2 application is described below with reference to FIG. 7. As shown in FIG. 7, the content management unit is set by clip. In accordance with the previously described type 1 application as described with reference to FIG. 5, the content management unit (CPS unit) is set to include all layers from the application layer to the clip. In the type 2 application, the content management unit (CPS unit) is set by clip as shown in FIG. 7.

The content management unit (CPS unit) is so set that data updating including data addition, deletion and editing is performed on disk recorded content. The type 2 application supporting the structure of the data recorded in RE and E type disk based BDAV format contains the three layers of (A) application layer, (B) reproducing period specifying file (playlist) layer and (C) clip (content data file) layer.

The relationship between the three layers is relatively more flexible than the layers in the type 1 application. When content editing is performed, title and playlist are added or deleted. The correspondence of title, playlist and clip is frequently modified, and the relationship is thus set to be flexible to take into consideration such frequent modifications.

In the type 2 application, such data updating is considered. The content management unit (CPS unit) including only a clip having actual content is set. The application layer containing title and the playlist are thus excluded from the content management unit (CPS unit). With this arrangement, data updating including content addition, deletion and editing is facilitated.

The setting structure of the unit key in the type 2 application is described below with reference to FIG. 8. In the type 2 application as shown in FIG. 8, the CPS unit is set responsive to the clip, and the unit key for each clip is set. FIG. 8 illustrates the concept of the CPS unit key file. The actual data structure of the CPS unit key file is described below with reference to FIG. 9.

FIG. 9 illustrates syntax of the CPS unit key file. As shown in FIG. 9, a unit key file header 421 containing header information and a unit key block 422 containing encrypted data of the unit key are arranged in the CPS unit key file. A start address of the unit key block 422 is arranged prior to the unit key file header 421.

FIGS. 10A and 10B illustrate in detail the unit key file header 421 and the unit key block 422. FIG. 10A illustrates syntax of the unit key file header 421. FIG. 10B illustrates syntax of the unit key block 422. FIGS. 9 and 10A and 10B illustrate the structure of the CPS unit key file, and a setting example of the unit key file corresponding to the setting structure of the CPS unit discussed with reference to FIG. 8.

As shown in FIG. 10A, the unit key file header 421 of the CPS unit key file contains the following data:

(1) Application type (Application_Type): Identification information of an application format (for example, 1 for reproducing only disk format (BDMV) and 2 for recording and reproducing disk format (BDAV)). Data can be recorded on a recording and reproducing disk using a reproducing only disk format, but in that case, the format to be used is a reproducing only disk format (BDMV).

(2) Number of directories (Num_of_BD_Directory): The number of directories (1 for the reproducing only disk (BDMV) and 1-5 for the recording and reproducing disk (BDAV))

(3) CPS unit number mapped to menu thumbnail #1 (CPS_Unit_number for Menu Thumbnail #1): CPS unit number for menu thumbnail (4) CPS unit number mapped to mark thumbnail #1 (CPS_Unit_number for Mark Thumbnail #1): CPS unit number for mark thumbnail (5) Number of clips of directory I (Num_of_Clip #I): the number of clips set in directory I (6) ID#J of clip set in directory I (Clip_ID#J in Directory #I): ID of clip (five digit decimal number XXXXX of file name XXXXX.clipi). This data may not be set for reproducing only disk (BDMV).

(7) CPS unit number mapped to directory #I and title #J (CPS_Unit_number for Title #J in Directory #I): CPS unit number mapped to ID (title) of clip Those pieces of data are stored as the unit key file header 421. In the unit key file structured as illustrated in FIGS. 9 and 10A and 10B, one CPS unit number is mapped to each menu thumbnail, one CPS unit number is mapped to each mark thumbnail, and one CPS unit number is mapped to each clip (title) in each directory.

The unit key block 422 of FIG. 10B of the CPS unit key file contains the following data:

(1) Number of CPS units (Num_of_CPS_Unit): The number of CPS units on disk (2) Usage control information of MAC (MAC of Usage Rules #1): Value of massage authentication code (MAC) serving as falsification examination data for usage control information (CCI) for the CPS unit.

(3) MAC of media ID (MAC of Media ID #1): MAC value serving as falsification examination data for media ID [Media ID (serial number of recording type disk)]

(4) Encrypted CPS unit key for each CPS unit (Encrypted CPS Unit Key for CPS unit #1): Encryption data of unit key assigned to each CPS unit The BDMV format of the reproducing only disk (BDMV) as the information recording medium 100 is different from the BDAV format of the recording and reproducing disk (BDAV) as the information recording medium 100 in terms of data recording process and in terms of directory structure used by the reproducing application. The CPS unit key file of FIGS. 9 and 10A and 10B is applicable to both types of disks and both types of applications. The data structure of the CPS unit key file of FIGS. 9 and 10A and 10B are shown for exemplary purposes only, and a modest degree of modification thereto is acceptable. For example, ID#J of clip set in directory I (Clip_ID#J in Directory #I): ID of clip (five digit decimal number XXXXX of file name XXXXX.clipi) may not be set in the unit key file header 421 of FIG. 10A on the reproducing only disk (BDMV).

Figure 11:
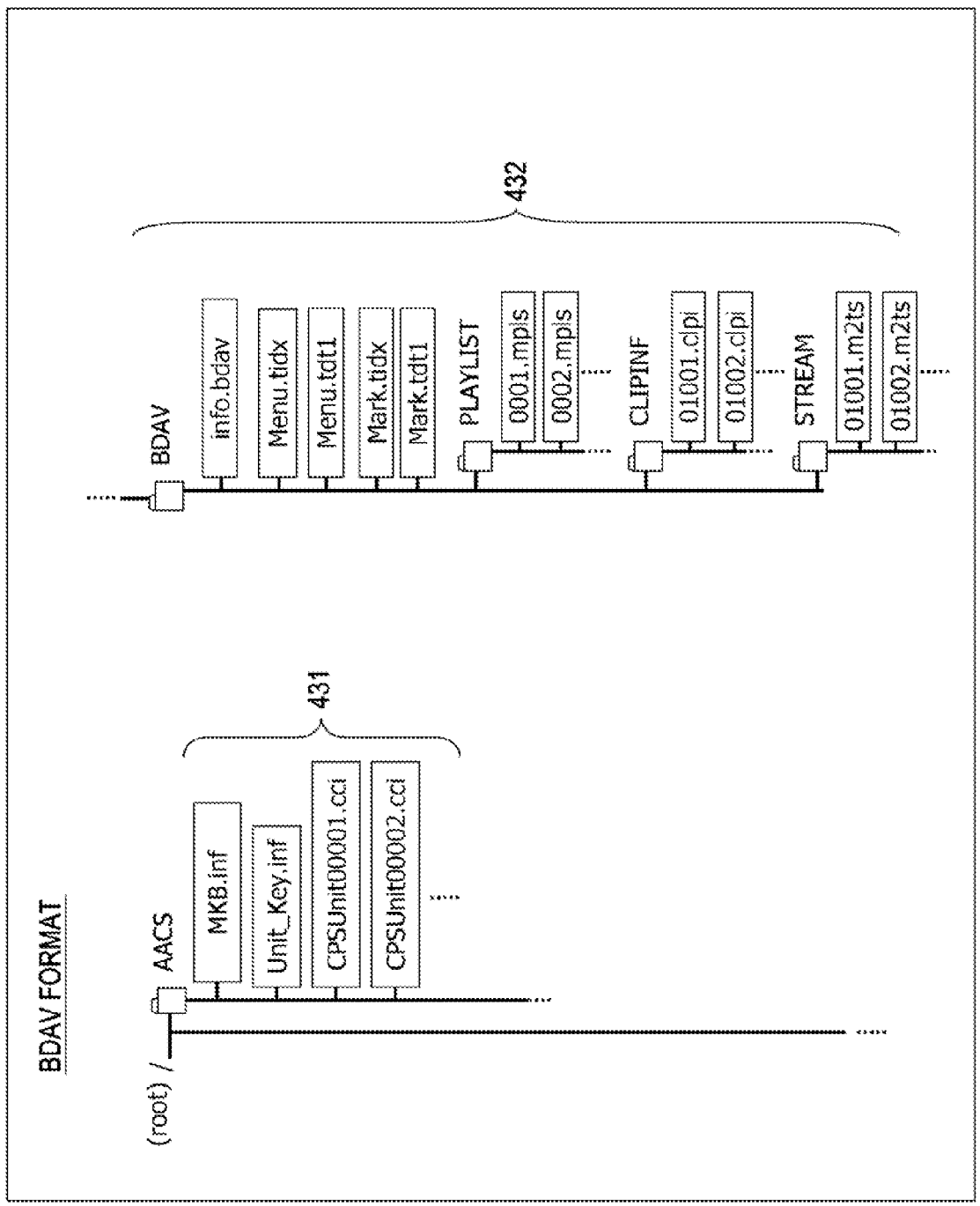
FIG. 11 illustrates a directory structure of the type 2 application.

FIG. 11 illustrates the directory structure in the BDAV format with the information recording medium 100 being the recording and reproducing disk (BDAV), namely, illustrates the directory structure of data to be recorded on the information recording medium 100. A data section 431 stores a variety of additional information and control information, namely, MKB (MKB.inf) as the previously described encryption block, the previously described unit key file (Unit_Key.inf), and the usage control information of the content for each CPS unit (CCI: copy control information) (CPSUnitxxxxxx.cci).

A data section 432 stores index information (info.bdav) as data in accordance with a variety of BDAV formats, a menu thumbnail (Menu.tidx and Menu.tidx1) forming still image content, mark thumbnail (Mark.tidx and Mark.tidx1), playlist (for example, 0001.mpls in PLAYLIST) forming moving image content, clip (for example, 01001.clpi in CLIPINF), and a stream data file (for example, 01001.m2ts in STREAM).

The structure of data recorded on a real-time basis in BDMV format on ROM type disk and content usage application (type 3 application) are described below.

The type 3 application is a newly proposed one rather than an existing one. The type 3 application is related to the structure of the recorded data appropriate for a real-time recording of broadcast content and the setting structure of the content management unit (CPS unit). The setting example of the content management unit (CPS unit) in accordance with the type 3 application is described with reference to FIG. 12.

Figure 12:
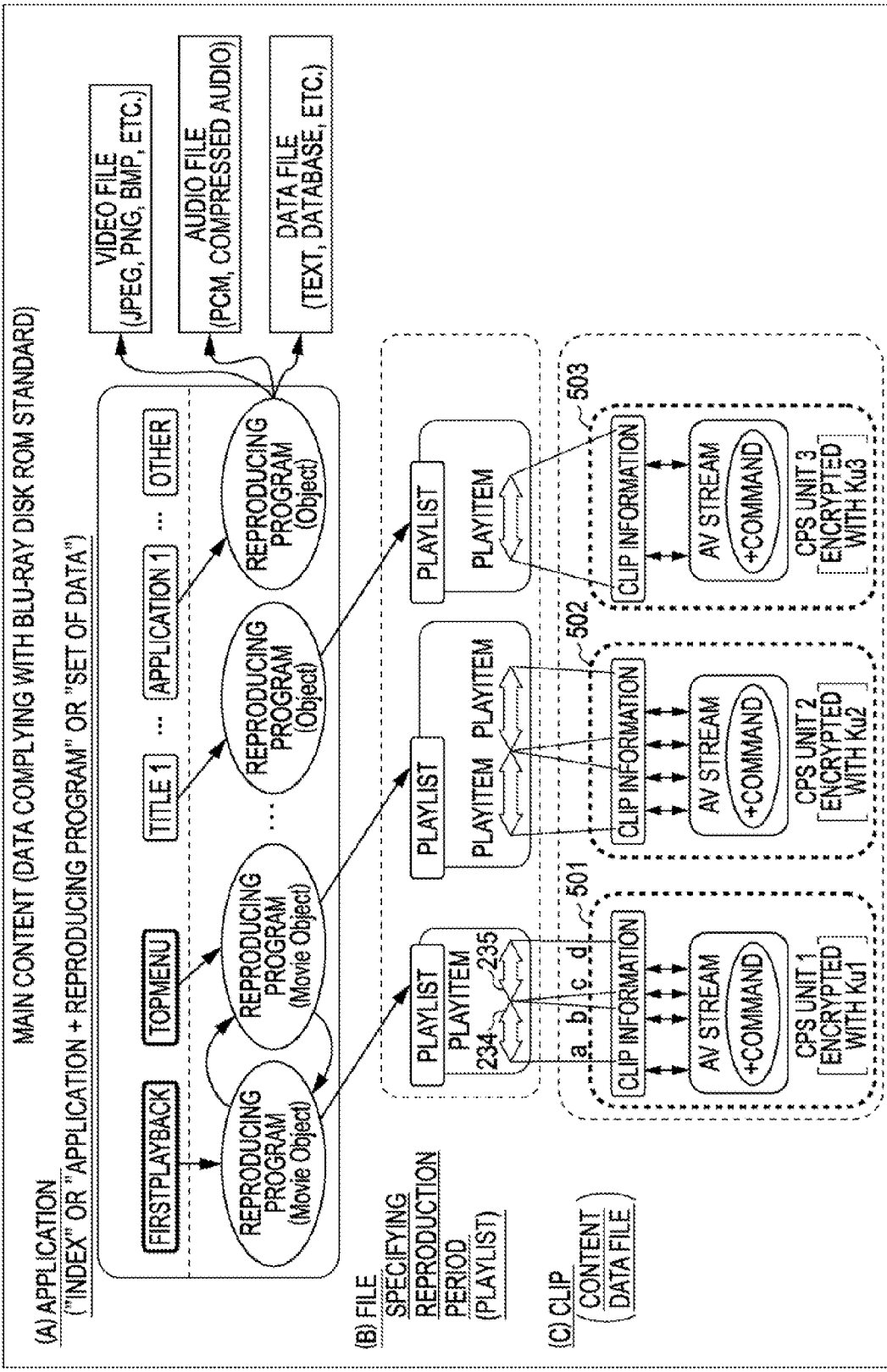
FIG. 12 illustrates a setting structure of a content management unit (CPS unit) of a type 3 application.

As shown in FIG. 12, the type 3 application has a BDMV data structure. As the type 1 application previously discussed with reference to FIGS. 4 and 5, the type 3 application contains the three layers of (A) application layer, (B) reproducing period specifying file (playlist) layer and (C) clip (content data file) layer.

The type 3 application defines the relationship of the three layers. The relationship is identical to the one in the type 1 application. In the type 3 application, however, the content management unit (CPS unit) is set by clip, and does not include (A) application layer and (B) reproducing period specifying file (playlist) layer as shown in FIG. 12. The setting of the content management unit (CPS unit) by clip is similar to the type 2 application of the previously described BDAV type. In other words, the type 3 application employs the setting structure of the content management unit (CPS unit) of the BDAV format type.

As shown in FIG. 12, three content management units (CPS units), i.e., CSP unit 1-501, CSP unit 2-502, and CSP unit 3-503 are arranged. The CSP unit is the content management unit (CPS unit) set by clip with the clip containing a clip information AV stream. The CPS unit excludes title information and playlist in the application layer.

When broadcast content is recorded on the disk on a real-time basis, real data without title and playlist and necessary attribute data are distributed, and the information processing apparatus records these pieces of received data on the disk. When recorded on a real time basis, the received data only is encrypted and recorded. Processing is thus efficiently performed. The type 3 application embodies a mechanism appropriate for such a real-time recording.

As the type 2 application, the type 3 application is appropriate for content editing. The type 3 application is also applicable to R type and RE type disk permitting data to be additionally recorded. The type 3 application thus supports content updating including content addition, deletion and editing.

Figure 13:
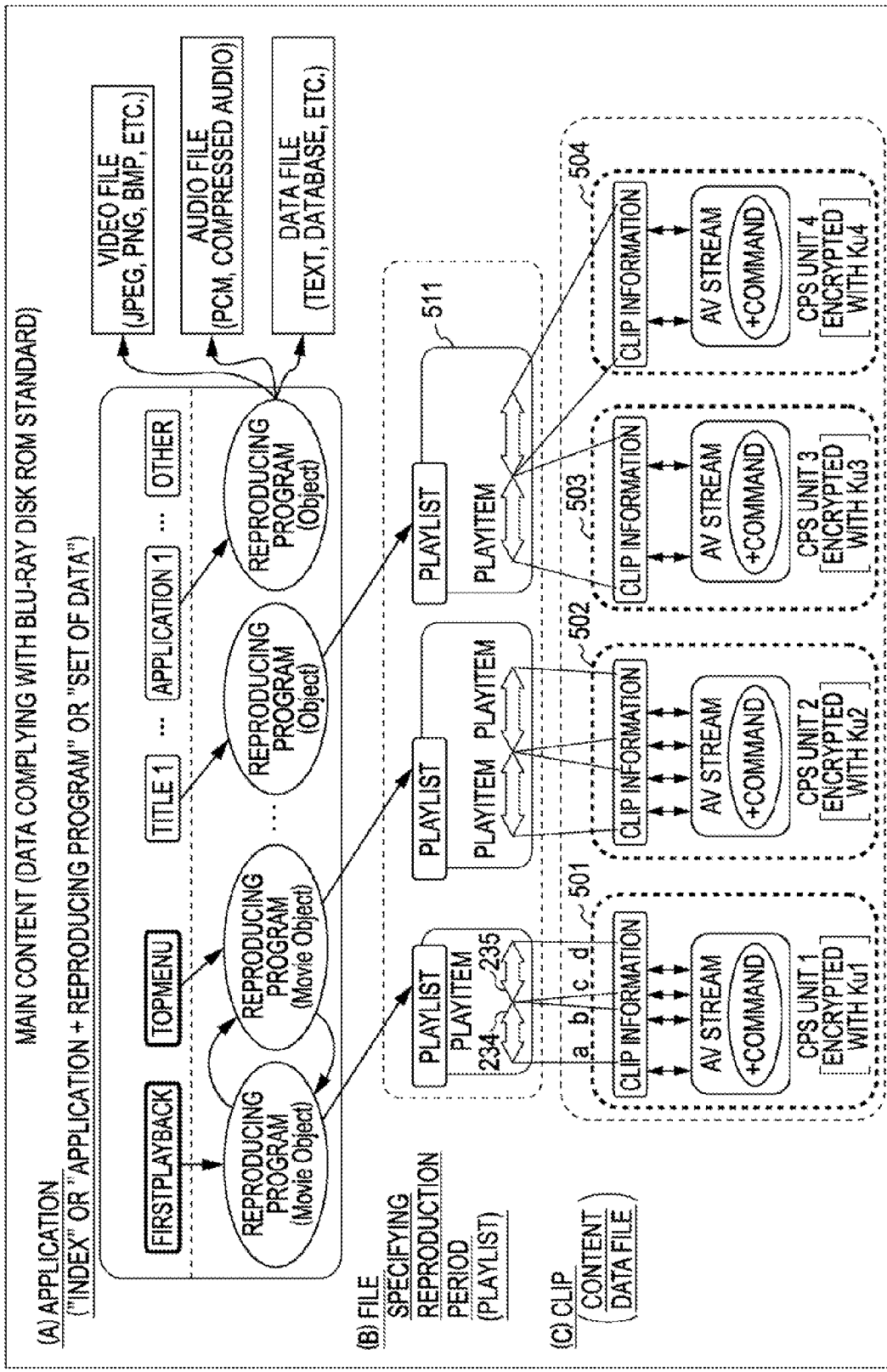
FIG. 13 illustrates a setting structure and editing process of the content management unit (CPS unit) of the type 3 application.

FIG. 13 illustrates a configuration in which a data editing process is perform to set a playlist straddling a plurality of different CPS units. For example, a CPS unit 4-504 is a new one as a clip including content additionally recorded on a disk. A data editing process is now performed to allow a playlist 511 to designate reproduction of content contained in the CPS unit 4-504. Through the data editing process, the playlist 511 contains reproducing period specifying period for reproducing the content contained in the CPS unit 4-504. More specifically, the playlist 511 is set as the one that contains as the reproducing period specifying information the two clips of CPS unit 3-503 and the CPS unit 4-504 of FIG. 13.

The type 3 application sets the content management unit (CPS unit) containing only the clip rather than playlist and title, thereby flexibly performing data updating such as content addition, deletion or editing.

Figure 14:
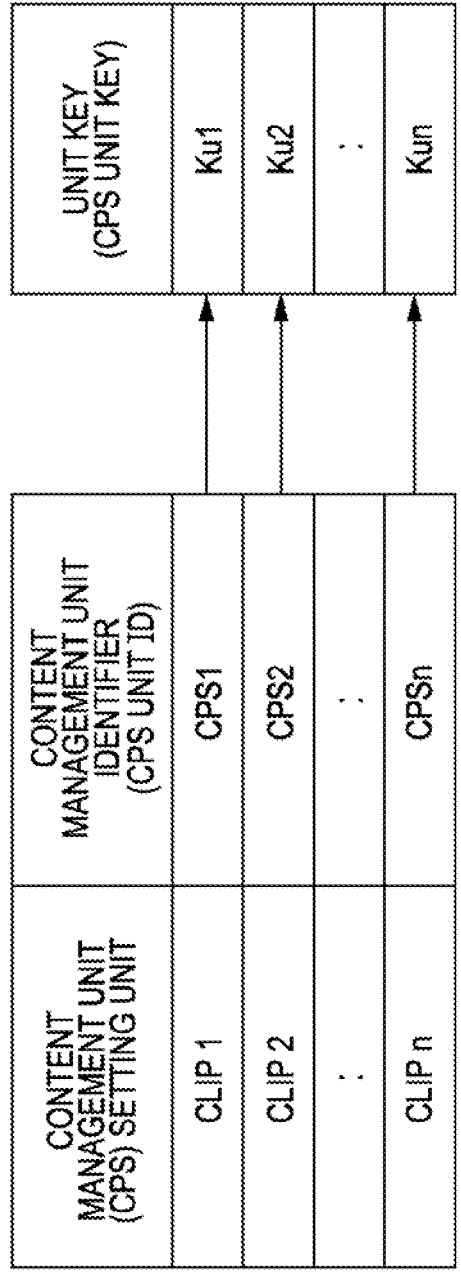
FIG. 14 illustrates a setting example of the content management unit (CPS unit) of the type 3 application and a setting example of the unit key.

The setting structure of the unit key complying with the type 3 application is described below with reference to FIG. 14. In accordance with the type 3 application, a CPS unit is set to a clip and a unit key for each clip is set as shown in FIG. 14. FIG. 14 illustrates the concept of the CPS unit key file. The data structure of an actual CPS unit key file is identical to the data structure of the CPS unit key file of the type 2 application previously discussed with reference to FIG. 9. More specifically, as previously discussed with reference to FIG. 9, the CPS unit key file contains the unit key file header 421 storing the header information and the unit key block 422 storing the encryption data of the unit key. The start address (Unit_Key_Block_start_address) of the unit key block is set prior to the unit key file header 421.

FIGS. 15A and 15B illustrates in detail the structures of the unit key file header 421 and the unit key block 422 in the type 3 application. FIG. 15A illustrates syntax of the unit key file header 421. FIG. 15B illustrates syntax of the unit key block 422. The structures of the unit key file header 421 and the unit key block 422 are almost identical to the structure of the CPS unit key file in the type 2 application previously discussed with reference to FIGS. 10A and 10B. The difference is that information indicating the type 3 application is contained. As in the type 2 application, the CPS unit is set by clip and each clip is assigned a CPS unit key in the type 3 application.

Figure 16:
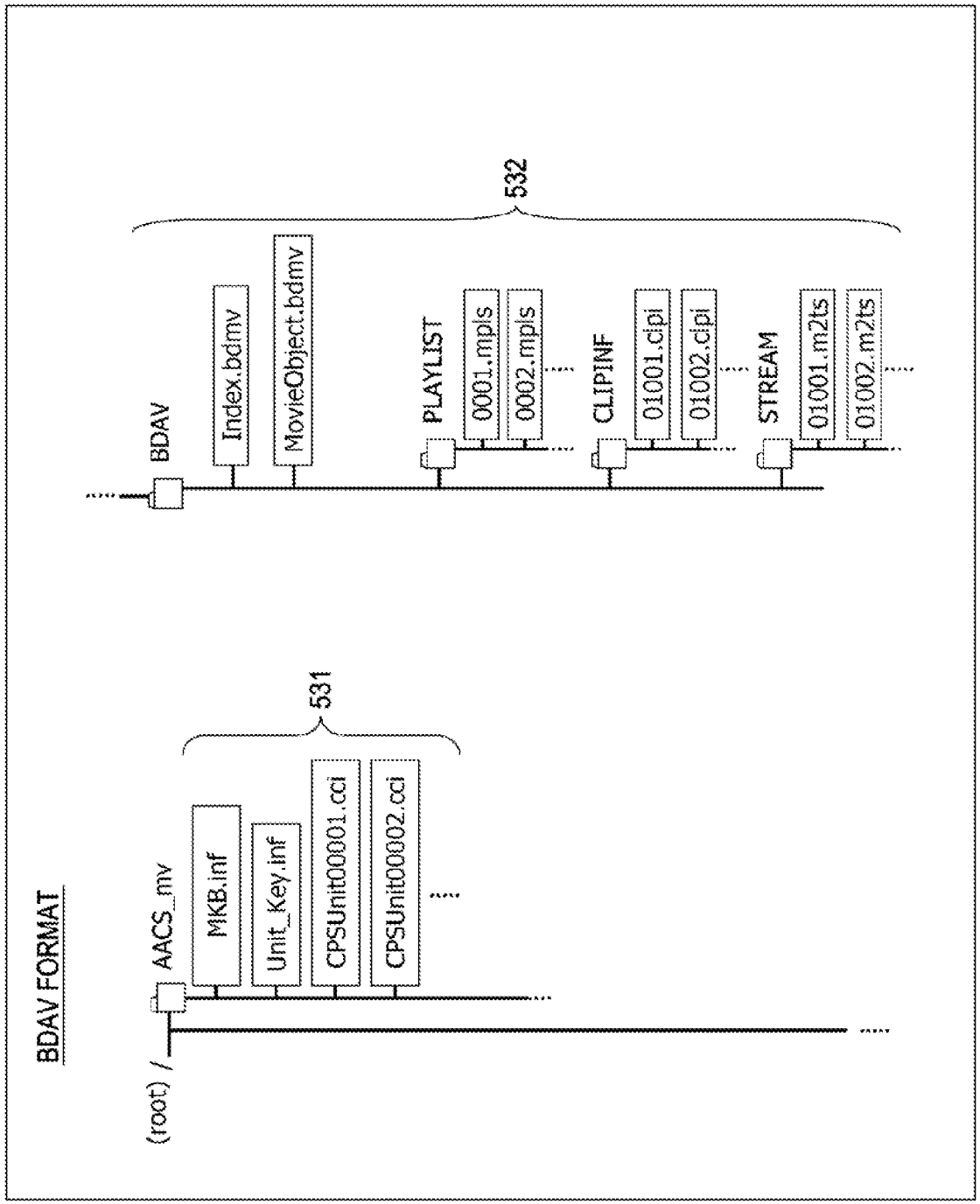
FIG. 16 illustrates a directory structure of the type 2 application.

FIG. 16 illustrates a directory structure in the BDAV format in the type 3 application, namely, a directory structure of data to be recorded on the information recording medium 100 in accordance with the type 3 application. A data section 531 stores a variety of additional information and control information, namely, MKB (MKB.inf) as the previously described encryption block, the previously described unit key file (Unit_Key.inf), and the usage control information of the content for each CPS unit (CCI: copy control information) (CPSUnitxxxxxx.cci). A data section 532 stores index information (info.bdmv) as data in accordance with a variety of BDMV formats, a movie object (MovieObject.bdmv) as a reproducing program, playlist (for example, 0001.mpls in PLAYLIST) forming moving image content, clip (for example, 01001.clpi in CLIPINF), and a stream data file (for example, 01001.m2ts in STREAM).

The content certificate [CC: Content Cert] with an electronic signature of a supervisor attached thereto is stored as data certifying the authenticity of the content in the type 1 application supporting the ROM type disk format. Content handled in the type 3 application contains broadcast content and real-time recorded content. It is not a requirement that content usage information of the content (such as CCI (content control information)) include the content certificate.

The structure of data downloaded and recorded in BDMV format on ROM type disk and the content usage application (type 4 application) are described below.

The type 4 application is a newly proposed one rather than an existing one. The type 4 application is related to the structure of the recorded data appropriate for a real-time recording of broadcast content and the setting structure of the content management unit (CPS unit). The setting example of the content management unit (CPS unit) in accordance with the type 4 application is described with reference to FIG. 17.

Figure 17:
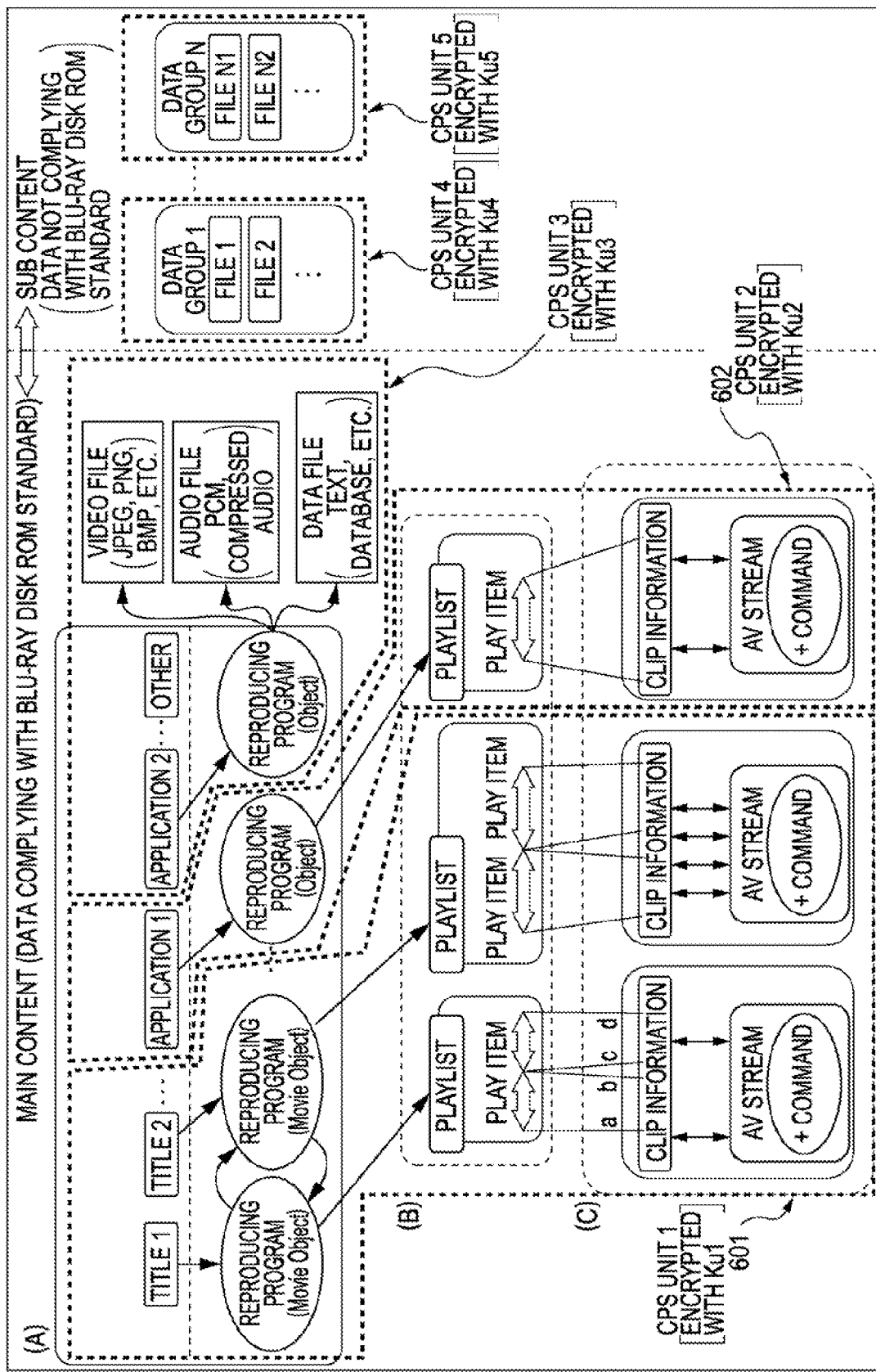
FIG. 17 illustrates a setting structure of the content management unit (CPS unit) of the type 3 application.

As shown in FIG. 17, the type 4 application has the BDMV format recorded data structure, and as the type 1 application described with reference to FIGS. 4 and 5, contains (A) application layer, (B) reproducing period specifying file (playlist) layer, and (C) clip (content data file) layer.

The relationship of these three layers is identical to the one in the type 1 application. As shown in FIG. 17, the content management unit (CPS unit) of the type 4 application contains all of A) application, (B) reproducing period specifying file (playlist), and (C) clip (content data file).

As shown in FIG. 17, the BDMV content contains, as members, CPS units 601 and 602, each containing clips. Each of the CPS units 601 and 602 contains (A) application, (B) reproducing period specifying file (playlist), and (C) clip (content data file).

The content management unit (CPS unit) of the type 4 application is identical to that of the type 1 application. However, the type 4 application is based on the premise that the data to be recorded is downloaded from a content server, for example. Management information that verifies that the content is supplied from an authorized server is set. The structure of the management information will be described later.

The setting structure of the unit key of the type 4 application is described below with reference to FIG. 18. As shown in FIG. 18, the type 4 application has the same unit key setting structure as the one of the type 1 application discussed with reference to FIG. 6. More specifically, in at least the main content, the index information at the application layer as the topmost layer is set by title, and each title is assigned the unit key.

The CPS unit key file is identical in data structure to the CPS unit key file of the type 1 through the type 3 application. For example, FIG. 9 illustrates the structure of the CPS unit key file of the type 4 application. As previously discussed with reference to FIG. 9, the CPS unit key file contains the unit key file header 421 storing the header information and the unit key block 422 storing the encryption data of the unit key. The start address of the unit key block (Unit_Key_Block_start_address) is set prior to the unit key file header 421.

The unit key file header 421 and the unit key block 422 of the type 4 application are described in detail with reference to FIGS. 19A and 19B. FIG. 19A illustrates syntax of the unit key file header 421 and FIG. 19B illustrates syntax of the unit key block 422. As in the type 1 application, the CPS unit is set by title in the application layer and the CPS unit is assigned a respective CPS unit key in the type 4 application.

Figure 20:
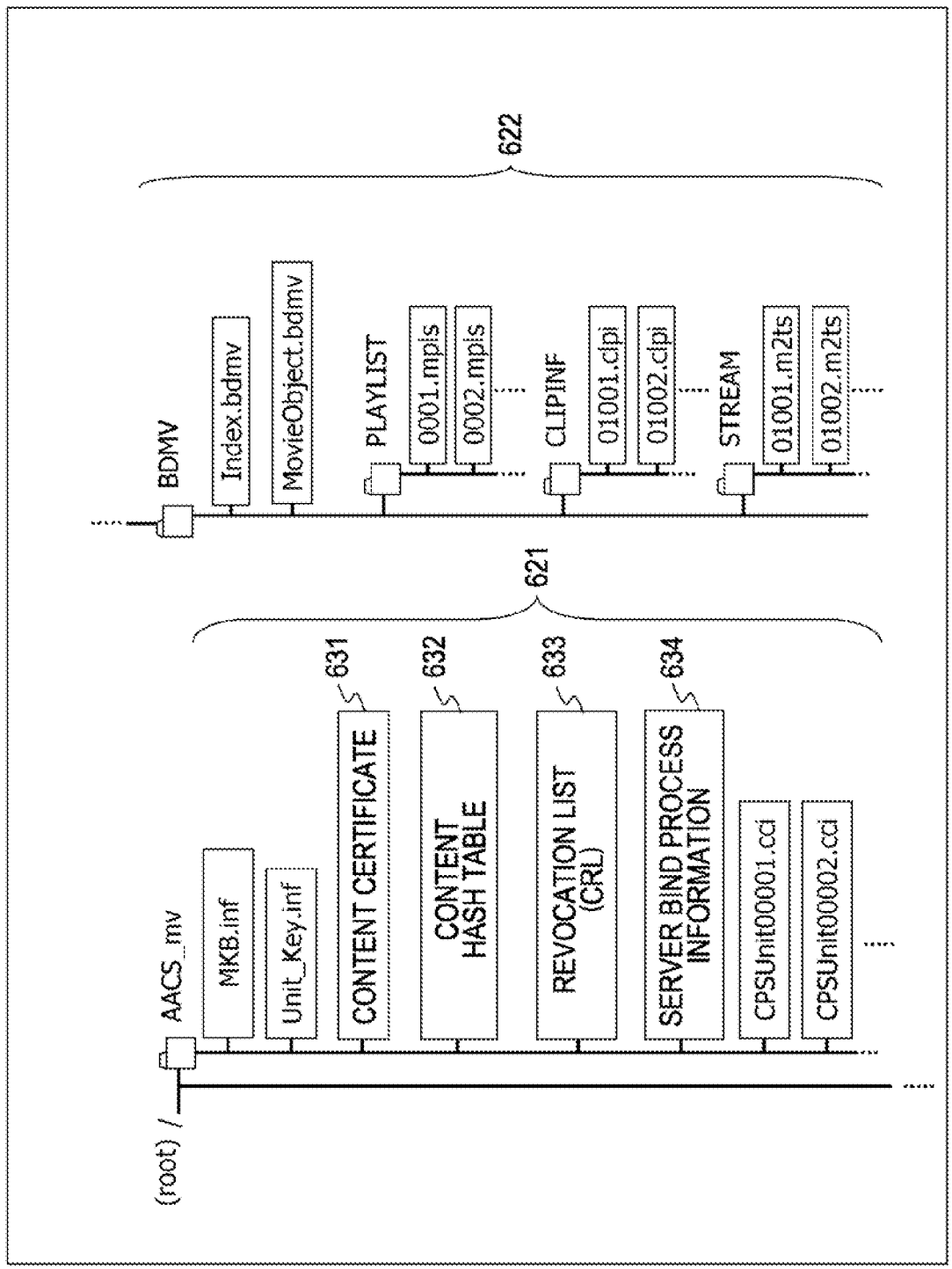
FIG. 20 illustrates a directory structure of the type 4 application.

FIG. 20 illustrates a directory structure of data to be recorded on the information recording medium 100 in accordance with the BDAV format of the type 4 application. As in the other application types, a data section 621 stores a variety of additional information and control information, namely, MKB (MKB.inf) as the previously described encryption block, the previously described unit key file (Unit_Key.inf), and the usage control information of the content for each CPS unit (CCI: copy control information) (CPSUnitxxxxxx.cci).

In the type 4 application, the data section 621 further contains a content certificate (CC) 631 certifying authenticity of the content, a content hash table (CHT) 632 containing a hash value of the content, a certificate revocation list (CRL) 633 indicating a revocation status of the information processing apparatus going to use the content, namely, indicating whether a public key certificate held by the information processing apparatus is revoked, and server bind process information 634 certifying that the content has been transmitted from an authorized server. The server bind process information 634 contains ID information of a content transmitting server and is tagged with an electronic signature of a content supervisor. The server bind process information 634 certifies that the content has been transmitted from the particular authorized server. A process using these pieces of information will be described later.

A data section 622 stores index information (info.bdmv) as data in accordance with a variety of BDMV formats, a movie object (MovieObject.bdmv) as a reproducing program, playlist (for example, 0001.mpls in PLAYLIST) forming moving image content, clip (for example, 01001.clpi in CLIPINF), and a stream data file (for example, 01001.m2ts in STREAM).

When the recording R type or RE type information recording medium is used, content to be recorded on the information recording medium is not only downloaded content but also real-time recording content in accordance with the type 3 application. The content is thus a mixture of these types of content. For example, as shown in FIG. 21, a directory may be designed to be discriminate between the real-time recording content in accordance with the type 3 application and the downloaded content in accordance with the type 4 application.

Figure 21:
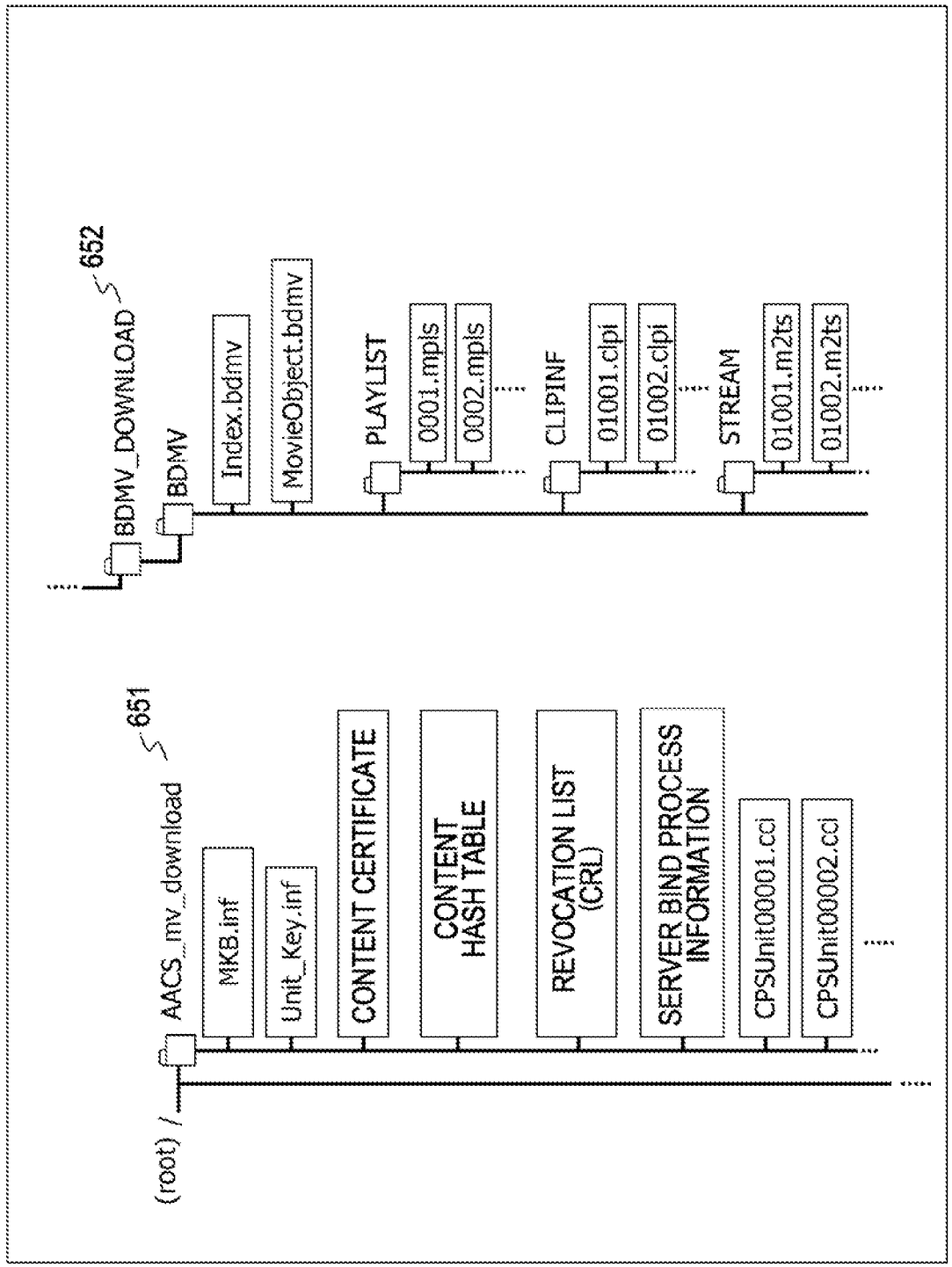
FIG. 21 illustrates the directory structure of the type 4 application.

The directory of FIG. 21 is for the downloaded content in accordance with the type 4 application. Set under a directory AACS_mv_download 651 are the downloaded content and management information for the downloaded content in accordance with the type 4 application. Set under a directory BDMV_DOWNLOAD are index information (info.bdmv) as data for the downloaded content, a movie object (MovieObject.bdmv) as a reproducing program, a playlist (such as 0001.mpls in PLAYLIST) forming moving content, a clip (such as 01001.clpi in CLIPINF), and a stream data file (such as 01001.m2ts in STREAM) for the type 4 application.

In this directory structure, a directory dedicated to real-time recording content (not shown) is also arranged in accordance with the type 3 application.

Figure 22:
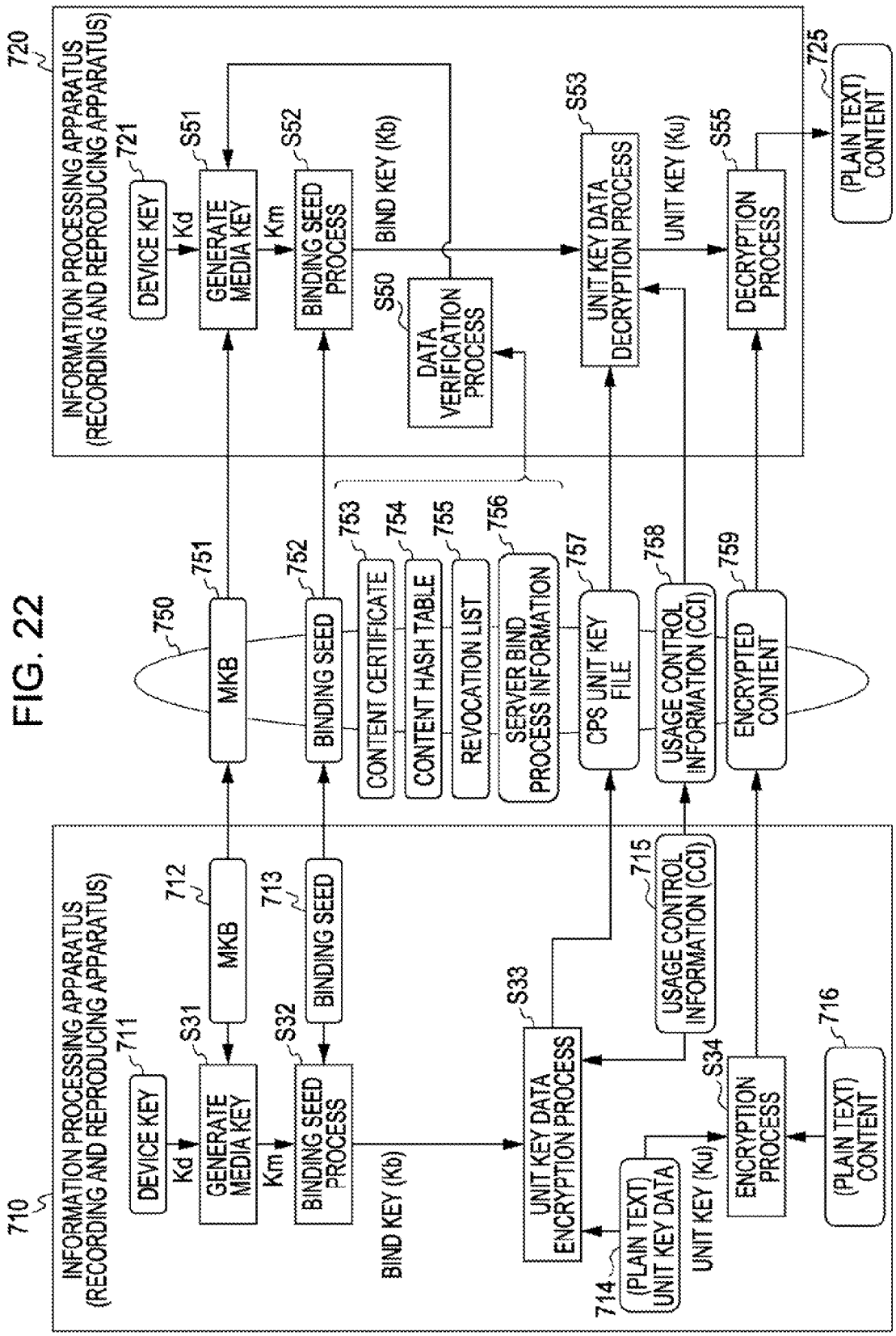
FIG. 22 illustrates recording and reproducing sequences of content of the type 4 application.
Figure 23:
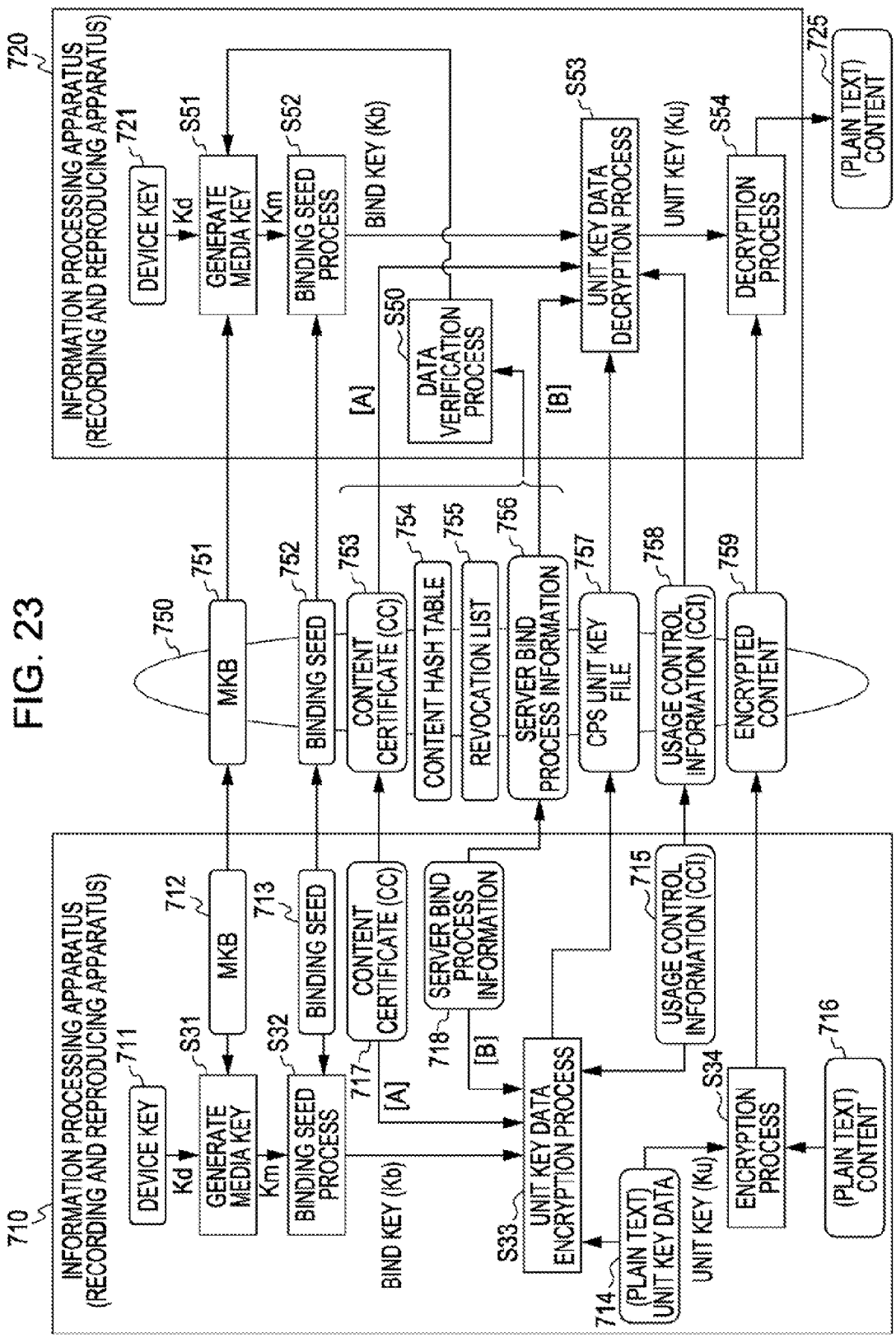
FIG. 23 illustrates the recording and reproducing sequences of the type 4 application.

FIGS. 22 and 23 illustrate sequence of recording and using (reproducing) the content downloaded from a server, in accordance with the type 4 application.

The process of FIG. 22 is different from the process of FIG. 23 in terms of generating a CPS unit key applied to content decryption. The process of FIG. 22 of generating the CPS unit key is the same data recording and reproducing sequence as described in the sequence of the type 2 application performed in the BDAV format.

If the downloaded content (of the type 4 application) is replaced with the content of the type 2 application, content can be reproduced without passing through the mechanism of content revocation. The content reproduction is permitted on condition that the content certificate (CC), the certification revocation list (CRL), and the server bind process information are certified. Unauthorized usage is avoided by performing content usage control in which the content of the type 4 application is discriminated from the content of the type 3 application. Even if re-registration process is performed by rewriting the header of the CPS_Unit key file of the downloaded content to Application Type=2, the authorized reproducing apparatus (player) cannot reproduce the content.

In the process of FIG. 23, the content certificate (CC) and/or the server bind process information are set as information required to generate the CPS unit key. The use of the information in the generation of the CPS unit key makes actually infeasible a key mechanism of modifying the downloaded content (Application type=4) to the Application type=2. The player checks the application type and then switches key generation method.

The process of FIG. 22 is described below. As shown in FIG. 22, an information processing apparatus 710 records CPS unit content on an information recording medium 750. An information processing apparatus 720 reads and decrypt CPS unit content recorded on the information recording medium 750. The information processing apparatuses 710 and 720 may be integrated into one apparatus.

The information processing apparatus 710 records the CPS unit content as the downloaded content of the type 4 application on the information recording medium 750. The process of the information processing apparatus 710 is described below. When a CPS unit is newly recorded on the information recording medium 750, the information processing apparatus 710 acquires a device key 711 stored on a memory thereof, and also acquires a media key in a MKB process of an encryption block storing the media key in step S31.

As previously discussed, the device key 711 is a secret key stored on the information processing apparatus that is licensed to use content. A media key block (MKB) 712 is generated in accordance with a tree-structured key distribution method known as one of broadcast encryption schemes. A media key Km can be acquired only through a decryption process in accordance with a device key Kd stored on an information processing apparatus of a user who has an effective license. Information distribution scheme in accordance with the layered tree structure is applied. Only when a user device (information processing apparatus) has an effective license, the media key Km is acquired. Any revoked user device cannot acquire the media key Km.

The MKB 712 may be received from the server together with the downloaded content. Alternatively, a MKB 751 pre-recorded on the information recording medium 750 may be read and used. The MKB 712 may also be acquired from another recording medium or a server via a network.

In step S32, a bind key i.e., an encryption key for encrypting the CPS unit key may be generated in a bind seed process using a bind seed 713, namely, an AES encryption process of the bind seed using the media key Km. The bind seed 713 is generated in a random-number generation process, for example. The information recording medium 750 stores a bind seed 752.

The information recording medium 750 also stores, in a process (not shown) together with the content, management data for the content downloaded from the server, i.e., a content certificate (CC) 753 certifying authenticity of the content, a content hash table (CHT) 754 containing the hash value of the content, a certificate revocation list (CRL) 755 indicating whether a public key certificate of the information processing apparatus has been revoked, and server bind process information 756 certifying that the content has been transmitted from an authorized server.

Step S33 is an encryption process execution step of a unit key 714. The unit key 714 is a CPS unit key for a CPS unit to which content 716 to be recorded belongs. The unit key 714 is received together with the content from the server. Alternatively, the unit key 714 may be generated based on a random number on the information processing apparatus. In step S33, an encryption process is performed on the unit key 714 using the bind key Kb as an encryption key generated based on the bind seed and usage control information (CCI) 715 for the CPS unit. The encrypted unit key 714 is stored on the information recording medium 750 as a CPS unit key file 757.

In step S33, process represented by equation [Enc(Kb,f(Ku_n,CCI))] is performed.

In accordance with the above equation, the encryption unit key is generated. The bind key Kb is generated based on the bind seed. Enc(a,b) is data into which data b has been encrypted with a key a, and f(a,b) is calculation result data based on data a and data b. For example, f(a,b) is obtained by exclusively OR gating the data a and the data b.

Equation [Enc(Kb,f(Ku_n,CCI))] means that an exclusive OR gate result of a unit key #n for a CPS unit #n and usage control information (CCI#n) for the CPS unit #n is encrypted with the bind key Kb generated based on the bind seed. A CPS unit key file 757 containing the unit key thus encrypted is recorded on the information recording medium 750. Usage control information (CCI) 758 is also recorded on the information recording medium 750.

When a unit key file containing as members a plurality of unit keys is set, a single unit key file composed of linked data of unit keys may be encrypted with a bind key. A single unit key file composed of linked data of each CPS unit key and usage control information (CCI) for the CPS unit may be encrypted with the bind key.

In step S34, the information processing apparatus 710 encrypts the content 716 with unit key 714. The content 716 is AV stream data contained in the CPS unit as the downloaded content. In step S34, encrypted content 759 as a result of encryption is recorded on the information recording medium 750. The encrypted content 759 as recorded data on the information recording medium 750 corresponds to a CPS unit as the downloaded content of the type 4 application.

A reproducing process of the content stored on the information recording medium 750 is described below in accordance with a sequence of the information processing apparatus 720. In step S50, the information processing apparatus 720 reads from the information recording medium 750 a content certificate (CC) 753 certifying authenticity of the content, a content hash table (CHT) 754 containing a hash value of the content, a certificate revocation list (CRL) 755 indicating a revocation status of the information processing apparatus going to use the content, namely, indicating whether a public key certificate held by the information processing apparatus is revoked, and server bind process information 756 certifying that the content has been transmitted from an authorized server. The information processing apparatus 720 performs a variety of verification processes in response to these certificates.

The information processing apparatus 720 verifies authenticity of the content based on the content certificate 753 and verifies on the certificate revocation list (CRL) 755 that the information processing apparatus 720 has not been revoked. In response to the server bind process information 756, the information processing apparatus 720 verifies that the content has been transmitted from the authorized server. After these verifications, processing proceeds to step S51. If one of these verifications fails, the process quits. In step S51, using a device key 721, the information processing apparatus 720 decrypts the MKB 751 as the encryption key block containing the media key Km stored on the information recording medium 750. The information processing apparatus 720 thus obtains the media key Km.

In step S52, an encryption process is performed using the media key Km acquired in the MKB process in step S51 and the bind seed 752 read from the information recording medium 750. An encryption key (bind key) Kb is thus generated. The key generation process may be performed in accordance with AES algorithm, for example.

In step S53, an encryption unit key contained in the CPS unit key file 757 read from the information recording medium 750 is decrypted with the bind key Kb. The CPS unit key file 757 contains encrypted data of the unit key [Kun] set for each CPS unit. As previously discussed, the CPS unit key file 757 contains the unit key as the encrypted data having the structure [Enc(Kb, f(Ku_n,CCI))]. The encrypted data is decrypted with the bind key Kb, the decrypted data is subjected to a calculation operation using the usage control information (CCI), and an exclusive OR gating operation. The CPS unit key thus results.

The encrypted unit key [Enc(Kb, f(Ku_n,CCI))] is decrypted with the bind key Kb, and data [Kt]=f(Ku_n,CCI) is acquired. The calculation operation using the usage control information (CCI) 758 read from the information recording medium 750 is performed on the data [Kt]=f(Ku_n,CCI). The unit key [Ku_n} thus results. The data [Kt]=f(Ku_n,CCI), if obtained by exclusive OR gating the unit key [Ku_n} and the usage control information [CCI], is subjected again to exclusive OR gating operation with the usage control information [CCI] read from the information recording medium 750. The unit key [Ku_n} results.

In step S54, the decryption process (such as AES_D) using the unit key [Ku_n] is performed the encrypted content 759 read from the information recording medium 750. Content 725 results.

FIG. 22 illustrates as one execution sequence of the information processing apparatus the recording process and reproducing process of the CPS unit content. For example, an information processing apparatus containing a drive accessing an information recording medium or an information processing apparatus such as a connected personal computer records or reproduce content. The recording process of the CPS unit key file or the acquisition process of the CPS unit key are performed through data exchange between a host side such as the information processing apparatus and the drive reading data from the information recording medium.

The process of FIG. 23 is described below. In the process, the content certificate (CC) and/or the server band information are set as information required to generate the CPS unit key. The use of the information in the generation of the CPS unit key makes actually infeasible a key mechanism of modifying the downloaded content (Application type=4) to the Application type=2. The player checks the application type and then switches key generation method.

The process of FIG. 23 is identical to the content recording process and the content usage (reproducing) discussed with reference to FIG. 22, except the difference to be described below.

To record the content on the information recording medium 750 in the process of FIG. 23, the information processing apparatus 710 uses a content certificate (CC) 717 and/or server bind process information 718 in step S33. The content certificate (CC) 717 and the server bind process information 718 are data received from the server from which the content is also received, and are respectively identical to the content certificate (CC) 753 and the server bind process information 756 to be recorded on the information recording medium 750.

In step S33, the unit key 714 is encrypted using the bind key Kb as an encryption key generated based on the bind seed, the usage control information (CCI) 715 for the CPS unit, and the content certificate (CC) 717 and/or the server bind process information 718.

The process in step S33 is represented by equation [Enc (Kb, f(Ku_n,CCI, CC, server bind process information))].

An encrypted unit key as data encrypted in accordance with the above equation is thus generated. The encryption key Kb is generated based on the bind seed. Enc(a,b) is data into which data b is encrypted with a key a. Further, f(a,b,c,d) represents operation result of data a, b, c and d, for example, results of an exclusive OR gating operation of data a, b, c and d.

The CPS unit key file 757 containing thus generated unit key is recorded on the information recording medium 750. The information recording medium 750 also records the usage control information (CCI) 758. The rest of operation relating to the content recording process remains identical to the process discussed with reference to FIG. 22.

The difference between the process of the information processing apparatus 720 performing the content usage (reproducing) process and the sequence discussed with reference to FIG. 22 is the decryption process of the unit key data in step S53. In step S53 of the process of FIG. 22, the encryption unit key contained in the CPS unit key file 757 read from the information recording medium 750 is decrypted with the bind key Kb. In step S53 of the process of FIG. 23, the encryption unit key contained in the CPS unit key file 757 is decrypted using the bind key Kb, the usage control information (CCI) 758, and at least one of the content certificate 753 and the server bind process information 756 recorded on the information recording medium 750.

The unit key file is data containing the encryption unit key [Enc(Kb,f(Ku_n,CCI,CC, server bind process information))] and stored on the information recording medium 750. The encrypted data is then decrypted with the bind key Kb and the decrypted data is subjected to the calculation process, such as, the exclusive OR gating operation using the usage control information (CCI) 758, the content certificate 753 and the server bind process information 756. The CPS unit key is then acquired.

Data [Kt]=f(Ku_n,CCI, CC, server bind process information) is acquired by decrypting with the bind key Kb the encrypted unit key [Enc(Kb,f(Ku_n,CCI, server bind process information))]. The unit key [Ku_n] is obtained by performing the calculation process on the data [Kt]=f(Ku_n,CCI, CC, server bind process information) using the usage control information (CCI) 758, the content certificate 753 and the server bind process information 756 read from the information recording medium 750.

The [Kt]=f(Ku_n,CCI, CC, server bind process information), if resulting data of an exclusive OR gating operation of the unit key [Ku_n], the usage control information [CCI], the content certificate (CC) and the server bind process information, is subjected again to an exclusive OR gating operation using the usage control information [CCI], the content certificate (CC), and the server bind process information read from the information recording medium 750. The unit key [Ku_n] results.

In step S54, a decryption process (using AED_D, for example) is performed on the encrypted content 759 read from the information recording medium 750 using the unit key [Ku_n]. The content 725 results.

As shown in FIG. 23, the encrypted unit key contained in the CPS unit key file is decrypted to acquire the CPS unit key applicable to decrypting the content. In such a decryption process, at least one of the content certificate 753 and the server bind process information 756 is required. Content usage is enabled only in a process different from the type 2 application. For example, the mechanism of key generation does not permit the downloaded content (Application Type=4) to be modified to a state of Application Type=2.

When content of a different type of application is recorded on the information recording medium 750, the information processing apparatus going to use the content first determines the application type of the content, and executes decryption and usage sequence in compliance with the determined application type.

Figure 24:
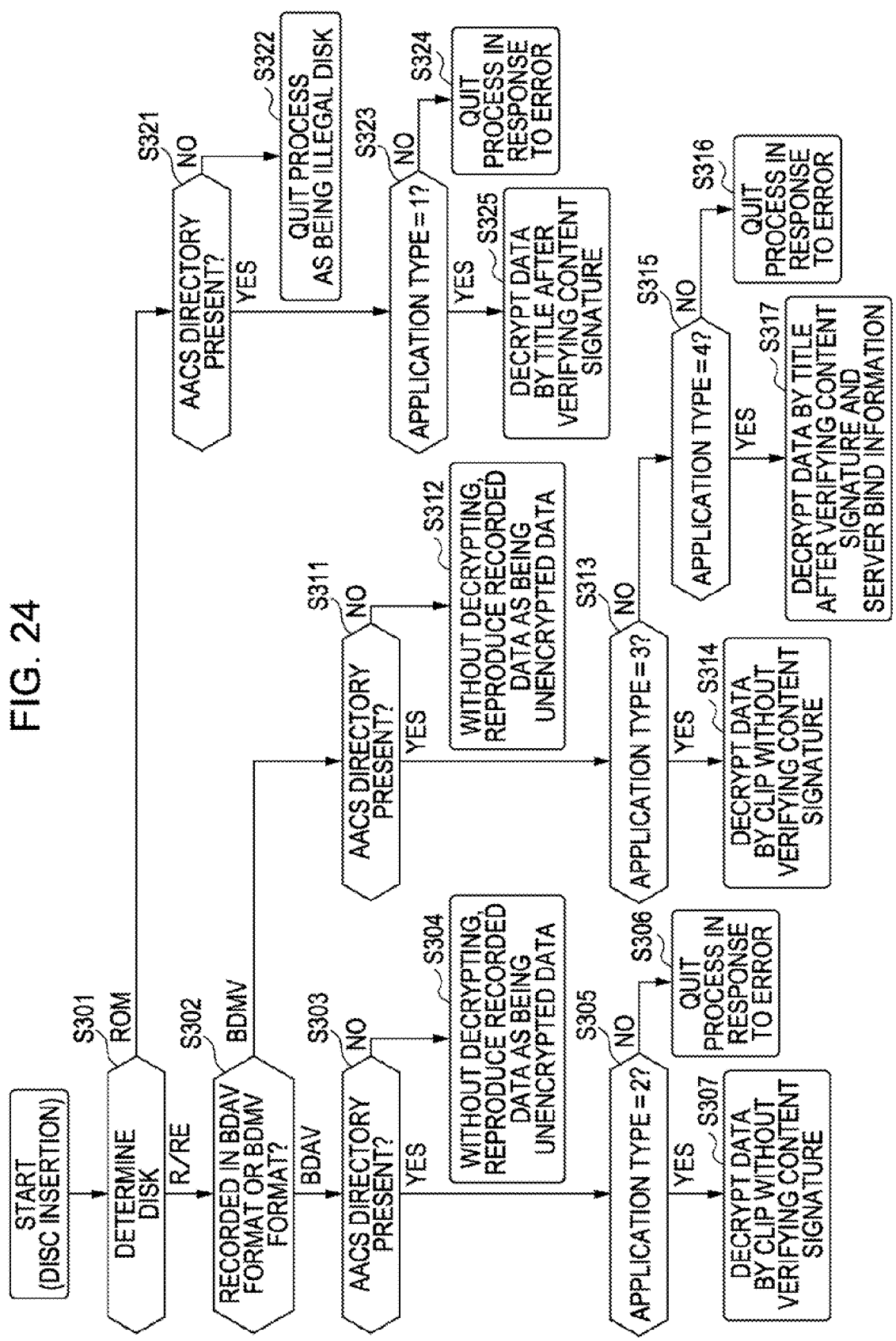
FIG. 24 is a flowchart illustrating a reproducing sequence of content.

FIG. 24 is a flowchart of the information processing apparatus that reads and reproduces the content from the information recording medium 750. The information recording medium 750 stores content of a variety of application types including the type 1 application through the type 4 application. A controller in the information processing apparatus performs a program of reproducing the content defined in advanced access content system (AACS) in accordance with the process of FIG. 24. The information processing apparatus determines the application type of the content recorded on the information recording medium 750 and performs content reproducing process satisfying each application type.

In step S301, the information processing apparatus determines an information recording medium (disk) loaded on the information processing apparatus. The disk determination process is performed to determine whether the loaded disk is a ROM disk permitting no data rewriting, an R disk or RE disk permitting data rewriting. The disk determination process may be performed by reading disk information, or by determining physical feature of the disk such as reflectance ratio of the disk or the presence or absence of wobbling on the disk.

The process of the ROM disk is described. In step S321, the controller in the information processing apparatus determines whether an AACS directory is set in the directory corresponding to the data recorded on the ROM disk. If it is determined in step S321 that the AACS directory is not set, processing proceeds to step S322. The controller determines that the loaded disk is not an authorized ROM disk storing AACS content, and quits processing without using the content.

If it is determined in step S321 that the AACS directory is set in the directory corresponding to the data recorded on the disk, processing proceeds to step S323. The controller determines whether the content type is the type 1 application. This determination may be performed by referring to attribute data corresponding to the content or storage data in the unit key file. If the controller determines in step S323 that the storage content is not the type 1 application, processing proceeds to step S324. In step S324, the controller detects an error, and quits processing. If it is determined in step S323 that the storage content is the type 1 application, the controller performs the content reproducing sequence for the type 1 application. More specifically, the content certificate is verified and the content usage process is performed based on the decryption of the CPS unit by title.

If it is determined in step S301 that the disk is R or RE disk, processing proceeds to step S302. The controller in the information processing apparatus verifies the recording format of the content. More specifically, the controller determines whether the data is recorded in the BDAV format or the BDMV format. As previously discussed, the data of the type 2 application is recorded in the BDAV format while the data of each of the type 3 and 4 applications is recorded in the BDMV format.

If it is determined in step S302 that the data is recorded in the BDAV format, processing proceeds to step S303. The controller determines whether an AACS directory is arranged in the directory of the data recorded on the disk.

If it is determined in step S303 that the AACS directory is not arranged in the directory corresponding to the data recorded on the disk, processing proceeds to step S304. The controller thus determines that content not requiring decryption process with the CPS unit key is recorded, and reproduces the content without performing the decryption process. If it is determined in step S303 that the AACS directory is arranged in the directory corresponding to the data recorded on the disk, processing proceeds to step S305. The controller determines whether the content type is the type 2 application. This determination process may be performed based on the attribute data of the content or the storage data in the unit key file.

If it is determined in step S305 that the content type is not the type 2 application, processing proceeds to step S306. In step S306, the controller detects an error and quits processing. If it is determined in step S305 that the content type is the type 2 application, the controller performs a content reproducing sequence of the type 2 application.

As previously discussed with reference to FIG. 7, the CPS unit is set by clip in the content of the type 2 application. The decryption process is performed by selecting the CPS unit and by acquiring the CPS unit key. Since the type 2 application does not require that the certificate of the content be recorded, the verification of the content certificate is skipped.

If it is determined in step S302 that the content recorded on the disk is in the BDMV format, processing proceeds to step S311. The controller in the information processing apparatus determines whether an AACS directory is arranged in the directory corresponding to the data recorded on the disk.

If it is determined in step S311 that an AACS directory is not arranged in the directory corresponding to the data recorded on the disk, processing proceeds to step S312. The controller determines that the content not requiring the decryption process with the CPS unit key is recorded, and reproduces the content without performing the decryption process. If it is determined in step S311 that an AACS directory is arranged in the directory corresponding to the data recorded on the disk, processing proceeds to step S313. The controller determines whether the content type is the type 3 application. This determination process is performed based on the attribute data of the content or the storage data in the unit key file.

If it is determined in step S313 that the content type is the type 3 application, processing proceeds to step S314. The controller performs a content reproducing sequence for the type 3 application. As previously discussed with reference to FIGS. 12 and 13, the CPS unit is set by clip. The controller selects the CPS unit by clip and acquires the CPS unit key, and then performs the decryption process. Since the type 2 application does not require that the certificate of the content be recorded, the verification of the content certificate is skipped.

If it is determined in step S313 that the storage content is not the type 3 application, processing proceeds to step S315. The controller determines whether the content type is the type 4 application. This determination process may be performed based on the attribute data of the content or the storage data in the unit key file. If it is determined in step S315 that the content type is not the type 4 application, processing proceeds to step S316. In step S316, the controller detects an error and quits processing.

If it is determined in step S315 that the content type is the type 4 application, the controller performs a content reproducing sequence of the type 4 application.

In the content of the type 4 application, the CPS unit is set by title. The controller selects the CPS unit by title, acquires the CPS unit key, and then performs the decryption process. The sequence actually performed is identical to the process described with reference to FIGS. 22 and 23. The type 4 application requires that the content certificate be recorded, and the content certificate is thus verified. In accordance with the type 4 application, the server bind process information is verified, and the encrypted unit key contained in the CPS unit key file is decrypted in the same process as described with reference to FIGS. 22 and 23.

Figure 25:
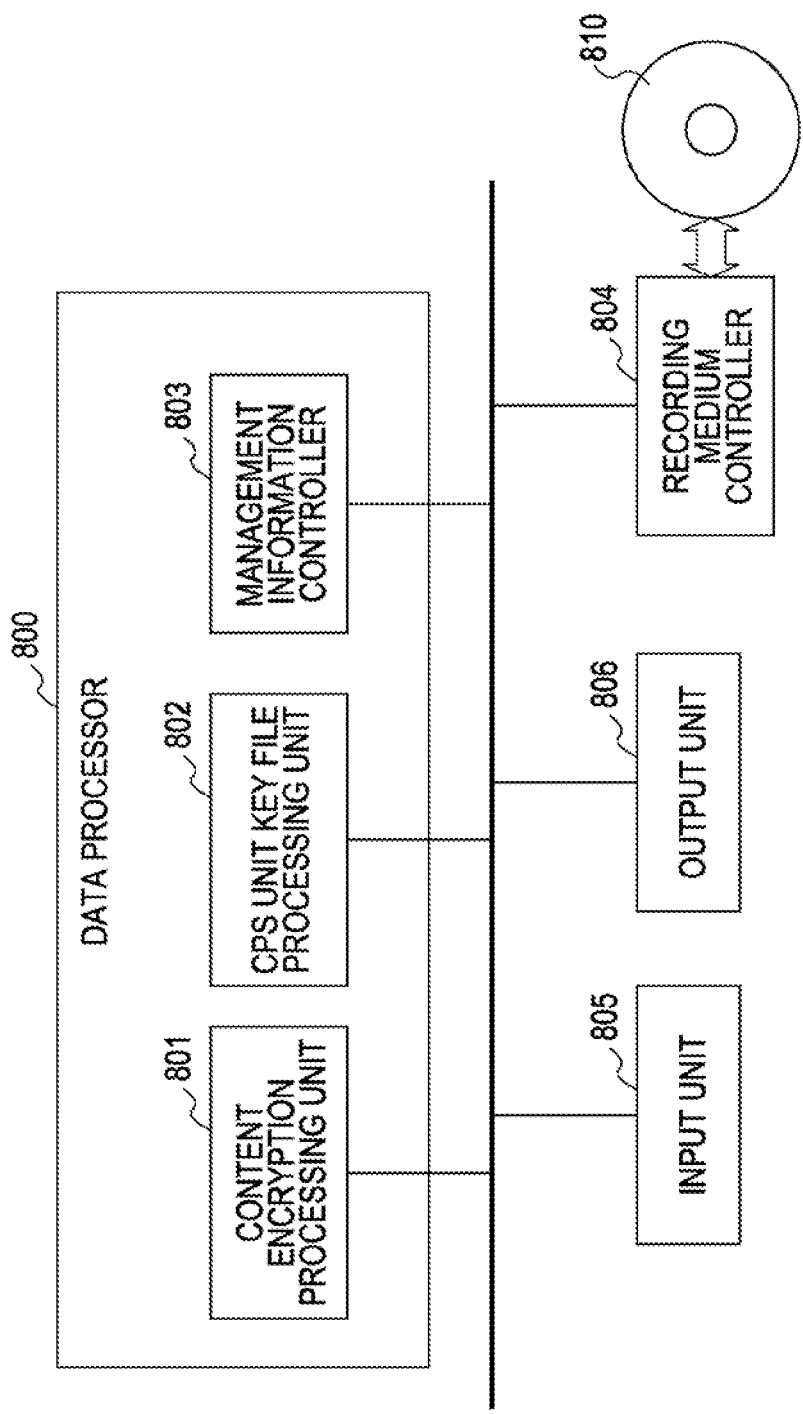
FIG. 25 is a functional block diagram of an information processing apparatus recording content on an information recording medium and decrypting, reproducing and using the content recorded on the information recording medium.

FIG. 25 is a block diagram illustrating an information processing apparatus that records content on an information recording medium, and decrypts, reproduces and uses content recorded on the information recording medium.

The information processing apparatus includes a data processor 800 including a content encryption processing unit 801, a CPS unit key file processing unit 802 and a management information controller 803, a recording medium controller 804, an input unit 805 and an output unit 806.

The content encryption processing unit 801 records data on an information recording medium 810. The content encryption processing unit 801 encrypts the data of the content management unit using the unit key corresponding to the content management unit (CPS unit) set as a usage control unit.

The CPS unit key file processing unit 802 generates the bind key based on the bind seed, and encrypts the bind key and the unit key contained in the unit key file that applies to a variety of information required in accordance with the application type. The unit key file or file data is encrypted using an encryption key. The encryption key is generated based on the seed that is updated in accordance with a change in the unit key contained in the unit key file.

The CPS unit key file processing unit 802 determines a usage control information file corresponding to a content management unit, a unit key file, and a content management unit, generates a variety of files, and determines the necessity of updating of the files. The recording medium controller 804 records on the information recording medium 810 the encrypted data, the unit key file, and the usage control information file in accordance with a recording data format or reads these pieces of data from the information recording medium 810. The data recorded on the information recording medium 810 contains moving content composed layer-structured data of clip containing index information, playlist and an AV stream.

In response to an increase or a decrease in the number of unit keys contained in the existing unit key file recorded on the information recording medium 810, a new bind seed having a new value is set, and an updated unit key file encrypted with a new bind key based on the new bind seed is thus generated.

The CPS unit key file processing unit 802 stores in the unit key file a new unit key that has been set in accordance with a new content management unit recorded on the information recording medium 810. The CPS unit key file processing unit 802 generates a new bind seed having a new value in response to the addition of the new unit key. The CPS unit key file processing unit 802 generates an update key file that has been encrypted with the new bind key based on the new bind seed. In response to the movement or deletion of the content management unit from the information recording medium 810, the CPS unit key file processing unit 802 deletes from the unit key file the unit key corresponding to the content management unit to be moved or deleted, and sets a new bind seed having a new value in response to the deletion of the unit key. The CPS unit key file processing unit 802 generates an updated unit key file that has been encrypted with the new bind key generated from the new bind seed.

The CPS unit key file processing unit 802 encrypts the unit key file or file data using the encryption key. The encryption key is generated by encrypting the bind seed with the media key that is acquired through an encryption key block with the device key stored on the information processing apparatus.

For example, the downloaded content for the type 4 application is recorded on the information recording medium 810. As previously discussed with reference to FIG. 23, the unit key file or file data is encrypted using one of the content certificate and the server bind process information.

The recording medium controller 804 records or reads a variety data on the information recording medium 810. In accordance with the unit key corresponding to the content management unit set as usage control unit of the content, the content encryption processing unit 801 decrypts the encrypted content that the recording medium controller 804 reads from the information recording medium 810.

The CPS unit key file processing unit 802 acquires the unit key corresponding to the content management unit from the unit key file recorded on the information recording medium 810. In this case, the CPS unit key file processing unit 802 generates an encryption key using the seed as key generation information acquired from the information recording medium 810, and based on the generated encryption key, decrypts the unit key file or file data, thereby acquiring the unit key.

The CPS unit key file processing unit 802 decrypts the unit key file or file data using the encryption key. The encryption key is generated by encrypting the bind seed with the media key that is acquired through the encryption key block process using the device key stored on the information processing apparatus.

For example, the downloaded content for the type 4 application is recorded on the information recording medium 810. As previously discussed with reference to FIG. 23, the unit key file or file data is decrypted using one of the content certificate and the server bind process information.

The input unit 805 receives content to be recorded, and content specifying information and edit processing information from the user. The output unit 806 outputs reproduced content.

Main processes performed by the data processor 800 during data recording and data reproducing are described below.

During data recording, the data processor 800 determines the application type of the encrypted content to be recorded on the information recording medium 810, and encrypts the unit key file or file data and the content in accordance with the sequence corresponding to the determined application type. For example, the data processor 800 determines whether the application of the content to be recorded is the application type of the real-time recording content. If the application of the content to be recorded is the application type of the real-time recording content, the data processor 800 encrypts with the unit key the content management unit as one clip, the clip being defined as a content storage file in the content recording format.

The data processor 800 determines whether the application type of the content to be recorded on the information recording medium 810 is the application type corresponding to the downloaded content. If it is determined that the application type of the content to be recorded on the information recording medium 810 is the application type corresponding to the downloaded content, the data processor 800 encrypts with the unit key the content management unit having a title as a unit, the title being defined in the content recording format.

If it is determined that the application type of the content to be recorded on the information recording medium 810 is the application type corresponding to the downloaded content, data processing is performed using at least one of the content certificate set the information corresponding to the downloaded content and the server bind process information. The data processing is performed in the encryption process of the encryption unit contained in the unit key file as described with reference to FIG. 23.

During data reproducing, the data processor 800 determines the application type of the encrypted content recorded on the information recording medium 810. The data processor 800 acquires the unit key and decrypts the content using the unit key in accordance with the process sequence corresponding to the application type. For example, the data processor 800 determines whether the information recording medium 810 is a ROM type permitting no data to be recorded thereon. If it is determined that the information recording medium 810 is a disk permitting data to be recorded thereon, the data processor 800 further determines the application type of the encrypted content recorded on the information recording medium 810. The data processor 800 acquires the unit key and decrypts the content with the unit key in accordance with the process sequence for the application type. In response to determination information of the application type of the encrypted content recorded on the information recording medium 810, the data processor 800 determines whether to verify the content certificate indicating authenticity of the content.

The data processor 800 determines whether the application type of the encrypted content recorded on the information recording medium 810 is an application type corresponding to the real-time recording content. If it is determined that the application type of the encrypted content recorded on the information recording medium 810 is an application type corresponding to the real-time recording content, the data processor 800 acquires from the unit key file the unit key corresponding to the content management unit having a clip as a unit, the clip being defined as a content storage unit in the content recording format. The data processor 800 decrypts the encrypted content recorded on the information recording medium 810 using the acquired unit key.

Furthermore, the data processor 800 determines whether the application type of the encrypted content recorded on the information recording medium 810 is an application type corresponding to the downloaded content. If it is determined that the application type of the encrypted content recorded on the information recording medium 810 is an application type corresponding to the downloaded content, the data processor 800 acquires from the unit key file the unit key corresponding to the content management unit having a title as a unit, the title being defined in the content recording format. The data processor 800 decrypts the encrypted content recorded on the information recording medium 810 using the acquired unit key.

If it is determined that the application type of the encrypted content recorded on the information recording medium 810 is the application type corresponding to the downloaded content, the data processor 800 acquires the unit key by decrypting the encrypted unit key contained in the unit key file. In the decryption process, the data processor 800 uses at least one of the content certificate set as the information corresponding to the downloaded content and the server bind process information.

A hardware structure of the information processing apparatus recording and reproducing the above described content is described below with reference to FIG. 26.

Figure 26:
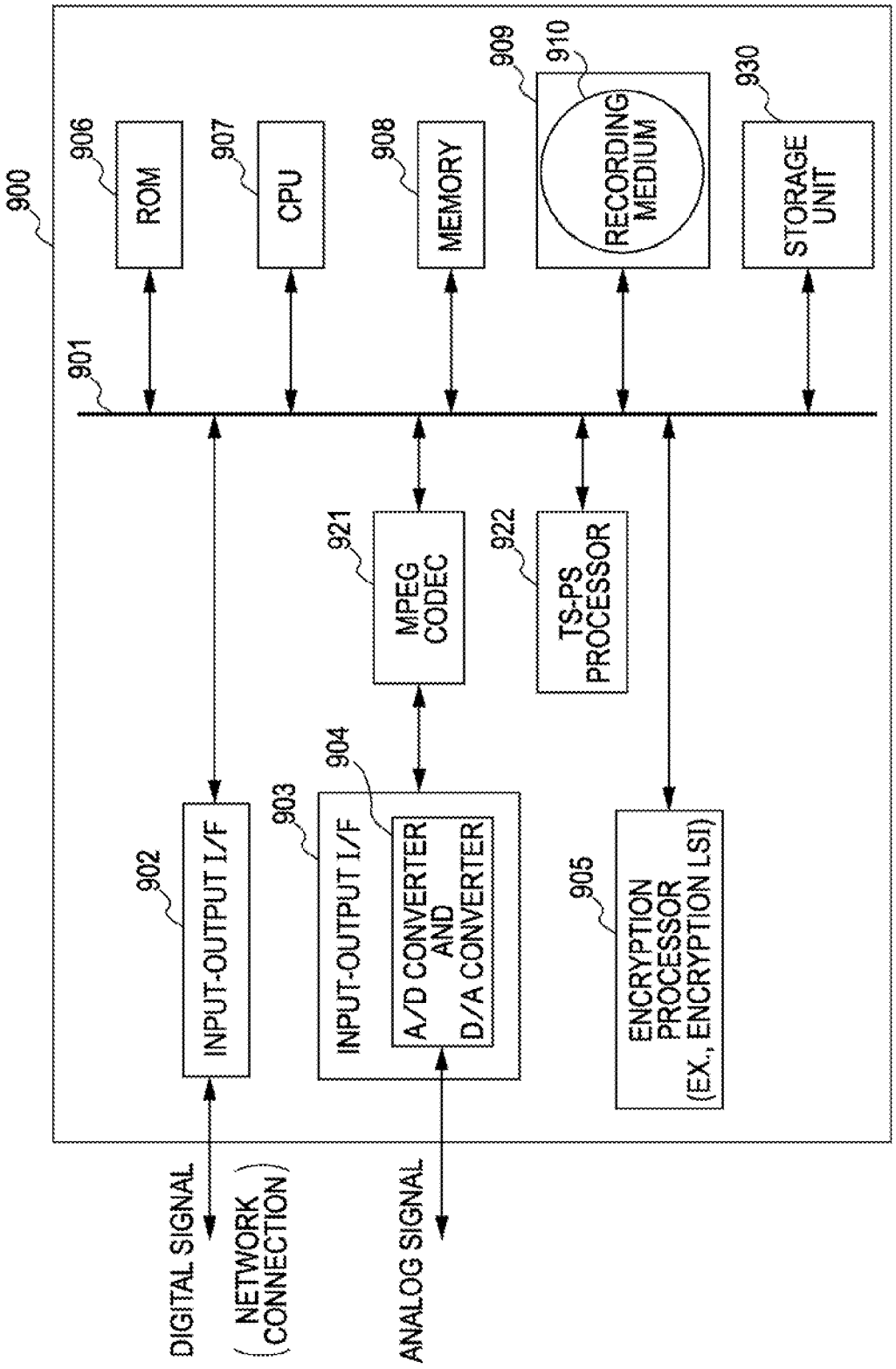
FIG. 26 illustrates the information processing apparatus with the information recording medium loaded thereon performing a reproducing process and a recording process.

An information processing apparatus 900 of FIG. 26 includes a drive 909 that drives an information recording medium 910 by inputting a data recording signal and outputting a data reproducing signal, a CPU 907 as control means for processing data in accordance with a variety of programs, a ROM 906 and a memory 908 serving as memory areas for the programs, parameters, etc., an input-output interface 902 for inputting and outputting digital signals, an input-output interface 903 having A/D and D/A converters 904 for inputting and outputting analog signals, an MPEG codec 921 for performing an encode and decode process to MPEG data, a TS-PS processor means 922 for performing TS (Transport Stream)-PS (Program Stream) process, an encryption processor 905 for performing a variety of encryption processes, and a storage unit 930 such as a hard disk. These elements are interconnected via a bus 901.

When the information processing apparatus 900 reproduces AV stream data composed MPEG-TS data from the information recording medium 910, data read from the information recording medium 910 by the drive 909 is decrypted by the encryption processor 905 as necessary, and is then divided into data units such video, audio, and the like by the TS-PS processor 922.

Digital data decoded by the MPEG codec 921 is converted into an analog signal by the D/A converter 904 in the input-output interface 903. The analog signal is then output. To output the digital signal, the MPEG-TS data decrypted by the encryption processor 905 is output as digital data through the input-output interface 902. The digital signal is output to a digital interface such as an IEEE 1394 interface, Ethernet (Registered Trademark) cable, or wireless LAN. The input-output interface 902 may have network interfacing function for networking.

When the information processing apparatus 900 converts data into a format compatible with an output destination, video, audio, etc., divided by the TS-PS processor 922 are rate converted and codec converted by the MPEG codec 921. The TS-PS processor 922 multiplexes the resulting data into MPEG-TS or MPEG-PS, which is then output via the input-output interface 902. It is also possible that under the control of the CPU 907, the divided data is codec processed into multiplexed files to be output from the input-output interface 902.

Management information for the CPS unit, such as the usage control information and the CPS unit key file, is read from the information recording medium 910 and then stored on the memory 908. The CPS unit key file is decrypted by generating the bind key and then using required information corresponding to the application type. The CPS unit key thus results.

The operation of the information processing apparatus 900 for recording the received broadcast signal is described below. The data to be recorded can be either a digital signal input or an analog signal input. In the case of the digital signal input, the input-output interface 902 receives a digital signal. As necessary, the data is encrypted by the encryption processor 905 and the encrypted data is stored on the information recording medium 910.

When the input digital data is stored with the data format thereof converted, the MPEG codec 921, the CPU 907, and the TS-PS processor 922 convert the digital data into data having a storage data format. The converted data is then encrypted by the encryption processor 905. The encrypted data is then stored on the information recording medium 910. In the case of the analog signal input, the input-output interface 903 receives an analog signal. The analog signal is then converted into a digital signal by the A/D converter 904, and then converted by the MPEG codec 921 into codec format for use in recording.

The TS/PS processor 922 converts the data into AV multiplexed data having a recording data format. The multiplexed data is further encrypted by the encryption processor 905 as necessary, and the encrypted data is then stored on the information recording medium 910.

Information required by the information processing apparatus 900 may be acquired via a network from outside the information processing apparatus 900. The acquired data is temporarily stored on the memory 908 in the information processing apparatus 900. Data to be stored includes key information required for content reproduction, data such as image and audio to be reproduced in synchronization with content reproduction, and content management information such content usage control information (CCI).

A program executing the reproducing process and recording process is stored on the ROM 906. During execution of the program, the memory 908 serves as a working area storing parameters and data. FIG. 26 illustrates the information processing apparatus that records and reproduces data. An information processing apparatus may be configured to have a reproducing function only or a recording function only. The present invention is also applicable to such an information processing apparatus.

The above-referenced series of process steps may be performed using hardware, software or a combination thereof. If the process steps are performed using software, a program of the software may be installed from a recording medium onto a computer built in dedicated hardware or a general-purpose personal computer enabled to perform a variety of functions with a variety of programs installed thereon.

The program may be pre-recorded on a hard disk or a read-only memory (ROM) as a recording medium. The program may also be recorded temporarily or permanently on a removable recording medium such as a flexible disk, a compact disk read-only memory (CD-ROM), a magneto-optical (MO) disk, a digital versatile disk (DVD), a magnetic disk, or a semiconductor memory. Such a removable recording medium may be supplied as package software.

The program is installed onto a computer from the above-mentioned removable recording medium. Furthermore, the program may be transmitted to the computer from a download site in a wireless fashion. Alternatively, the program may be transmitted to the computer from the download site via a network such as the Internet in a wired fashion. The computer receives the transmitted program and stores the received program onto a recording medium thereof, such as a hard disk.

The processes described in this specification is performed in the time-series order sequence as previously stated. Alternatively, the process steps may be performed in parallel or separately. The word system in this specification refers to a logical set of a plurality of apparatuses, and is not limited to a single-housing apparatus.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus for reproducing content recorded on an information recording medium, comprising:
    a recording medium controller that reads data recorded on the information recording medium; and
    a data processor that acquires from a unit key file recorded on the information recording medium a unit key corresponding to a content management unit set as a usage control unit of content, and decrypts encrypted content recorded on the information recording medium using the acquired unit key,
    wherein the data processor determines an application type, out of a plurality of application types, of the encrypted content recorded on the information recording medium, and acquires the unit key and decrypts the encrypted content in accordance with a process sequence corresponding to the application type, the process sequence being different for each application type, and
    wherein each of the plurality of application types is designated by a data format in which the encrypted content is recorded on the information recording medium and a recording format of the information recording medium.

2. The information processing apparatus according to claim 1, wherein the data processor determines whether the information recording medium is of a read-only memory type disk that does not permit data to be re-written thereon, and when the information recording medium is of a disk type that permits data to be re-written thereon, determines the application type of the encrypted content recorded on the information recording medium, thereby acquiring the unit key and decrypting the encrypted content in accordance with the process sequence corresponding to the application type.

3. The information processing apparatus according to claim 1, wherein the data processor determines whether to examine a content certificate, indicating authenticity of the content, in response to determination information of the application type of the encrypted content recorded on the information recording medium.

4. The information processing apparatus according to claim 1, wherein the data processor determines whether the application type of the encrypted content recorded on the information recording medium supports real-time recording content, and acquires from the unit key file the unit key corresponding to the content management unit, which is represented by a clip, the clip being defined as a content storage file in a content recording format, and decrypts the encrypted content recorded on the information recording medium using the acquired unit key when the application type is determined to support the real-time recording content.

5. The information processing apparatus according to claim 1, wherein the data processor determines whether the application type of the encrypted content recorded on the information recording medium supports downloaded content, and acquires from the unit key file the unit key corresponding to the content management unit as a title as a unit, the title being defined in a content recording format, and decrypts the encrypted content recorded on the information recording medium using the acquired unit key when the application type is determined to support the downloaded content.

6. The information processing apparatus according to claim 5, wherein upon determining that the application type of the encrypted content recorded on the information recording medium supports the downloaded content, the data processor acquires the unit key using at least one of a content certificate set as information corresponding to the downloaded content and server bind process information when the unit key is acquired by decrypting an encrypted unit key contained in the unit key file.

7. The information processing apparatus according to one of claims 1 through 6, wherein the data processor generates an encryption key using a seed as key generation information acquired from the information recording medium, and acquires the unit key by decrypting the encrypted unit key contained in the unit key file using the generated encryption key.

8. The information processing apparatus according to claim 7, wherein the data processor decrypts the encrypted unit key contained in unit key file using an encryption key that is generated by encrypting the seed using a media key, the media key being acquired through an encryption key block process using a device key stored on the information processing apparatus.

9. An information processing apparatus for recording information on an information recording medium, comprising:
   a data processor that generates encrypted content by encrypting content to be recorded on the information recording medium using a unit key corresponding to a content management unit as a usage control unit of content, and generates an encrypted unit key file by encrypting the unit key,
   wherein the data processor determines an application type, out of a plurality of application types, of the content to be recorded on the information recording medium, and encrypts the unit key and the content in accordance with a process sequence corresponding to the application type, the process sequence being different for each application type, and
   wherein each of the plurality of application types is designated by a specification of a data format in which the encrypted content is recorded on the information recording medium and a recording format of the information recording medium.

10. The information processing apparatus according to claim 9, wherein the data processor determines whether the application type of the encrypted content to be recorded on the information recording medium supports real-time recording content, and using the unit key, encrypts the content management unit as a clip as a unit, the clip being defined as a content storage file in a content recording format when the application type is determined to support the real-time recording content.

11. The information processing apparatus according to claim 9, wherein the data processor determines whether the application type of the encrypted content to be recorded on the information recording medium supports downloaded content, and using the unit key, encrypts the content management unit which is represented by a title, the title being defined as a content storage file in a content recording format when the application type is determined to support the downloaded content.

12. The information processing apparatus according to claim 11, wherein upon determining that the application type of the encrypted content to be recorded on the information recording medium supports the downloaded content, the data processor encrypts the unit key using at least one of a content certificate set as information corresponding to the downloaded content and server bind process information when the unit key to be recorded in the unit key file is encrypted.

13. The information processing apparatus according to one of claims 9 through 12, wherein the data processor generates an encryption key using a seed as key generation information, and encrypts the unit key to be recorded in the unit key file based on the generated encryption key.

14. The information processing apparatus according to claim 13, wherein the data processor encrypts the unit key to be recorded in the unit key file using an encryption key that is generated by encrypting the seed using a media key, the media key being acquired through an encryption key block process using a device key stored on the information processing apparatus.

15. A non-transitory computer readable storage medium having computer readable program codes embodied in the medium, which when executed, cause a data processor to execute:
   storing a content management unit, as a usage control unit of content, containing data being encrypted using a unit key corresponding to each content management unit;
   generating an encryption key using a seed, the seed having a value that is updated based on a modification in the unit key that is contained in a unit key file, the unit key file storing file data, one of the unit key file and the file data being encrypted with the encryption key;
   storing a content certificate for proving authenticity of the content; and
   storing server bind process information containing identification information of a content providing server.

16. The information recording medium according to claim 15, further recording a content hash table containing a hash value of the content.

17. The information recording medium according to claim 15, further recording a revocation list as an effectiveness determination list of a public key certificate of an information processing apparatus.

18. The information recording medium according to claim 15, wherein the server bind process information comprises the identification information of the content providing server, and is tagged with an electronic signature of an administrator.

19. An information processing method for use in an information processing apparatus, comprising:
   storing a content management unit, implemented by a data processor implemented in an information processing apparatus, as a usage control unit of content, containing data being encrypted using a unit key corresponding to each content management unit;
   generating an encryption key using a seed, the seed having a value that is updated based on a modification in a unit key that is contained in a unit key file, the unit key file storing file data, one of the unit key file and the file data being encrypted with the encryption key;

storing a content certificate for proving authenticity of the content; and storing server bind process information containing identification information of a content providing server.

20. An information processing method for reproducing content recorded on an information recording medium, comprising steps of:

reading data recorded on the information recording medium; and processing data, by a data processor implemented by an information processing apparatus, by acquiring from a unit key file recorded on the information recording medium a unit key corresponding to a content management unit set as a usage control unit of content, and by decrypting encrypted content recorded on the information recording medium using the acquired unit key, the data processing step including determining an application type, out of a plurality of application types, of the encrypted content recorded on the information recording medium, and acquiring the unit key and decrypting the encrypted content in accordance with a process sequence corresponding to the application type, the process sequence being different for each application type, wherein each of the plurality of application types is designated by a data format in which the encrypted content is recorded on the information recording medium and a recording format of the information recording medium.

21. The information processing method according to claim 20, wherein the data processing step comprises determining whether the information recording medium is of a read-only memory type disk that does not permit data to be re-written thereon, and when the information recording medium is of a disk type that permits data to be re-written thereon, determining the application type of the encrypted content recorded on the information recording medium, and acquiring the unit key and decrypting the encrypted content in accordance with the process sequence corresponding to the application type.

22. The information processing method according to claim 20, wherein the data processing step comprises determining whether to examine a content certificate, indicating authenticity of the content, in response to determination information of the application type of the encrypted content recorded on the information recording medium.

23. The information processing method according to claim 20, wherein the data processing step comprises determining whether the application type of the encrypted content recorded on the information recording medium supports real-time recording content, and acquiring from the unit key file the unit key corresponding to the content management unit as which is represented by a clip, the clip being defined as a content storage file in a content recording format, and decrypting the encrypted content recorded on the information recording medium using the acquired unit key if the application type is determined to support the real-time recording content.

24. The information processing method according to claim 20, wherein the data processing step comprises determining whether the application type of the encrypted content recorded on the information recording medium supports downloaded content, and acquiring from the unit key file the unit key corresponding to the content management unit as a title as a unit, the title being defined in a content recording format, and decrypting the encrypted content recorded on the information recording medium using the acquired unit key when the application type is determined to support the downloaded content.

25. The information processing method according to claim 24, wherein if the application type of the encrypted content recorded on the information recording medium is determined to support the downloaded content, the data processing step comprises acquiring the unit key using at least one of a content certificate set as information corresponding to the downloaded content and server bind process information when the unit key is acquired by decrypting an encrypted unit key contained in the unit key file.

26. The information processing method according to one of claims 20 through 25, wherein the data processing step comprises generating an encryption key using a seed as key generation information acquired from the information recording medium, and acquiring the unit key by decrypting the encrypted unit key contained in the unit key file using the generated encryption key.

27. The information processing method according to claim 26, wherein the data processing step comprises decrypting the encrypted unit key contained in unit key file using an encryption key that is generated by encrypting the seed using a media key, the media key being acquired through an encryption key block process using a device key stored on an information processing apparatus.

28. An information processing method for recording information on an information recording medium, comprising:

processing data, by a data processor implemented by an information processing apparatus, for generating encrypted content by encrypting content to be recorded on the information recording medium using a unit key corresponding to a content management unit as a usage control unit of content, and for generating an encrypted unit key file by encrypting the unit key, the data processing step including determining an application type, out of a plurality of application types, of the content to be recorded on the information recording medium, and encrypting the unit key and the content in accordance with a process sequence corresponding to the application type, the process sequence being different for each application type, wherein each of the plurality of application types is designated by a data format in which the encrypted content is recorded on the information recording medium and a recording format of the information recording medium.

29. The information processing method according to claim 28, wherein the data processing step comprises determining whether the application type of the encrypted content to be recorded on the information recording medium supports real-time recording content, and using the unit key, encrypts the content management unit as a clip as a unit, the clip being defined as a content storage file in a content recording format when the application type is determined to support the real-time recording content.

30. The information processing method according to claim 28, wherein the data processing step comprises determining whether the application type of the encrypted content to be recorded on the information recording medium supports downloaded content, and using the unit key, encrypting the content management unit which is represented by a title, the title being defined in a content recording format when the application type is determined to support the downloaded content.

31. The information processing method according to claim 28, wherein when the application type of the encrypted content to be recorded on the information recording medium is determined to support the downloaded content, the data processing step comprises encrypting the unit key using at least one of a content certificate set as information corresponding to the downloaded content and server bind process information when the unit key to be recorded in the unit key file is encrypted.

32. The information processing method according to one of claims 28 through 31, wherein the data processing step comprises generating an encryption key using a seed as key generation information, and encrypting the unit key to be recorded in the unit key file based on the generated encryption key.

33. The information processing method according to claim 32, wherein the data processing step comprises encrypting the unit key to be recorded in the unit key file using an encryption key that is generated by encrypting the seed using a media key, the media key being acquired through an encryption key block process using a device key stored on an information processing apparatus.

34. A non-transitory computer readable storage medium having computer readable program codes embodied in the medium for causing a computer to reproduce content recorded on an information recording medium, the computer readable program codes, which when executed, cause a data processor to execute:

reading data recorded on the information recording medium; and processing data by acquiring from a unit key file recorded on the information recording medium a unit key corresponding to a content management unit set as a usage control unit of content, and by decrypting encrypted content recorded on the information recording medium using the acquired unit key, the data processing step including determining an application type, out of a plurality of application types, of the encrypted content recorded on the information recording medium, and acquiring the unit key and decrypting the encrypted content in accordance with a process sequence corresponding to the application type, the process sequence being different for each application type, wherein each of the plurality of application types is designated by a data format in which the encrypted content is recorded on the information recording medium and a recording format of the information recording medium.

35. A non-transitory computer readable storage medium having computer readable program codes embodied in the medium for causing a computer to record information on an information recording medium, the computer readable program codes, which when executed, cause a data processor to execute:

processing data for generating encrypted content by encrypting content to be recorded on the information recording medium using a unit key corresponding to a content management unit as a usage control unit of content, and for generating an encrypted unit key file by encrypting the unit key, the data processing step including determining an application type, out of a plurality of application types, of the content to be recorded on the information recording medium, and encrypting the unit key and the content in accordance with a process sequence corresponding to the application type, the process sequence being different for each application type, wherein each of the plurality of application types is designated by a data format in which the encrypted content is recorded on the information recording medium and a recording format of the information recording medium.

36. The information processing apparatus according to claim 1, wherein one of the plurality of application types is further designated by a specification of whether the encrypted content is downloaded in real-time.

37. The information processing apparatus according to claim 1, wherein the data format is one of BDAV-format and BDMV-format.

38. The information processing apparatus according to claim 1, wherein the recording format is one of read-only, rewriteable, and recordable.

* * * * *